United States Patent
Sajeepa et al.

(10) Patent No.: US 10,949,370 B2
(45) Date of Patent: Mar. 16, 2021

(54) POLICY-DRIVEN STORAGE IN A MICROSERVER COMPUTING ENVIRONMENT

(71) Applicant: Cisco Technology, Inc., San Jose, CA (US)

(72) Inventors: Prabhath Sajeepa, Milpitas, CA (US); Sagar Borikar, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/804,199

(22) Filed: Feb. 28, 2020

(65) Prior Publication Data

US 2020/0201799 A1 Jun. 25, 2020

Related U.S. Application Data

(63) Continuation of application No. 15/869,256, filed on Jan. 12, 2018, now Pat. No. 10,585,830, which is a (Continued)

(51) Int. Cl.
*G06F 13/38* (2006.01)
*G06F 13/40* (2006.01)
(Continued)

(52) U.S. Cl.
CPC ........ *G06F 13/385* (2013.01); *G06F 13/1631* (2013.01); *G06F 13/24* (2013.01);
(Continued)

(58) Field of Classification Search
CPC .............. G06F 13/385; G06F 13/4022; G06F 13/4282; G06F 13/1631; G06F 13/24; Y02D 10/151; Y02D 10/14
See application file for complete search history.

(56) References Cited

U.S. PATENT DOCUMENTS

| 4,688,695 A | 8/1987 | Hirohata |
| 5,263,003 A | 11/1993 | Cowles et al. |

(Continued)

FOREIGN PATENT DOCUMENTS

| EP | 2228719 | 9/2010 |
| EP | 2439637 | 4/2012 |

(Continued)

OTHER PUBLICATIONS

Steve McQuerry, "Cisco UCS M-Series Modular Servers for Cloud-Scale Workloads," White Paper, Cisco Systems, Inc., Sep. 2014, 11 pages; http://www.cisco.conn/c/en/us/solutions/collateral/data-center-virtualization/unifiedconnputing/whitepaper_c11-732876.pdf.

(Continued)

Primary Examiner — Idriss N Alrobaye
Assistant Examiner — Ronald T Modo
(74) Attorney, Agent, or Firm — Polsinelli PC

(57) ABSTRACT

An example method for facilitating policy-driven storage in a microserver computing environment is provided and includes receiving, at an input/output (I/O) adapter in a microserver chassis having a plurality of compute nodes and a shared storage resource, policy contexts prescribing storage access parameters of respective compute nodes and enforcing the respective policy contexts on I/O operations by the compute nodes, in which respect a particular I/O operation by any compute node is not executed if the respective policy context does not allow the particular I/O operation. The method further includes allocating tokens to command descriptors associated with I/O operations for accessing the shared storage resource, identifying a violation of any policy context of any compute node based on availability of the tokens, and throttling I/O operations by other compute nodes until the violation disappears.

20 Claims, 15 Drawing Sheets

Related U.S. Application Data continuation of application No. 14/965,750, filed on Dec. 10, 2015, now Pat. No. 9,892,075.

(51) Int. Cl.
  *G06F 13/42* (2006.01)
  *G06F 13/16* (2006.01)
  *G06F 13/24* (2006.01)

(52) U.S. Cl.
  CPC ...... *G06F 13/4022* (2013.01); *G06F 13/4282* (2013.01); *Y02D 10/00* (2018.01)

(56) References Cited

U.S. PATENT DOCUMENTS

| | | |
|---|---|---|
| 5,339,445 A | 8/1994 | Gasztonyi |
| 5,430,859 A | 7/1995 | Norman et al. |
| 5,457,746 A | 10/1995 | Dolphin |
| 5,535,336 A | 7/1996 | Smith et al. |
| 5,588,012 A | 12/1996 | Oizumi |
| 5,617,421 A | 4/1997 | Chin et al. |
| 5,680,579 A | 10/1997 | Young et al. |
| 5,690,194 A | 11/1997 | Parker et al. |
| 5,740,171 A | 4/1998 | Mazzola et al. |
| 5,742,604 A | 4/1998 | Edsall et al. |
| 5,764,636 A | 6/1998 | Edsall |
| 5,809,285 A | 9/1998 | Hilland |
| 5,812,814 A | 9/1998 | Sukegawa |
| 5,812,950 A | 9/1998 | Tom |
| 5,838,970 A | 11/1998 | Thomas |
| 5,999,930 A | 12/1999 | Wolff |
| 6,035,105 A | 3/2000 | McCloghrie et al. |
| 6,043,777 A | 3/2000 | Bergman et al. |
| 6,101,497 A | 8/2000 | Ofek |
| 6,148,414 A | 11/2000 | Brown et al. |
| 6,185,203 B1 | 2/2001 | Berman |
| 6,188,694 B1 | 2/2001 | Fine et al. |
| 6,202,135 B1 | 3/2001 | Kedem et al. |
| 6,208,649 B1 | 3/2001 | Kloth |
| 6,209,059 B1 | 3/2001 | Ofer et al. |
| 6,219,699 B1 | 4/2001 | McCloghrie et al. |
| 6,219,753 B1 | 4/2001 | Richardson |
| 6,223,250 B1 | 4/2001 | Yokono |
| 6,226,771 B1 | 5/2001 | Hilla et al. |
| 6,260,120 B1 | 7/2001 | Blumenau et al. |
| 6,266,705 B1 | 7/2001 | Ullum et al. |
| 6,269,381 B1 | 7/2001 | St. Pierre et al. |
| 6,269,431 B1 | 7/2001 | Dunham |
| 6,295,575 B1 | 9/2001 | Blumenau et al. |
| 6,400,730 B1 | 6/2002 | Latif et al. |
| 6,408,406 B1 | 6/2002 | Parris |
| 6,542,909 B1 | 4/2003 | Tamer et al. |
| 6,542,961 B1 | 4/2003 | Matsunami et al. |
| 6,553,390 B1 | 4/2003 | Gross et al. |
| 6,564,252 B1 | 5/2003 | Hickman et al. |
| 6,647,474 B2 | 11/2003 | Yanai et al. |
| 6,675,258 B1 | 1/2004 | Bramhall et al. |
| 6,683,883 B1 | 1/2004 | Czeiger et al. |
| 6,694,413 B1 | 2/2004 | Mimatsu et al. |
| 6,708,227 B1 | 3/2004 | Cabrera et al. |
| 6,715,007 B1 | 3/2004 | Williams et al. |
| 6,728,791 B1 | 4/2004 | Young |
| 6,772,231 B2 | 8/2004 | Reuter et al. |
| 6,820,099 B1 | 11/2004 | Huber et al. |
| 6,847,647 B1 | 1/2005 | Wrenn |
| 6,848,759 B2 | 2/2005 | Doornbos et al. |
| 6,850,955 B2 | 2/2005 | Sonoda et al. |
| 6,876,656 B2 | 4/2005 | Brewer et al. |
| 6,880,062 B1 | 4/2005 | Ibrahim et al. |
| 6,898,670 B2 | 5/2005 | Nahum |
| 6,907,419 B1 | 6/2005 | Pesola et al. |
| 6,912,668 B1 | 6/2005 | Brown et al. |
| 6,952,734 B1 | 10/2005 | Gunlock et al. |
| 6,976,090 B2 | 12/2005 | Ben-Shaul et al. |
| 6,978,300 B1 | 12/2005 | Beukema et al. |
| 6,983,303 B2 | 1/2006 | Pellegrino et al. |
| 6,986,015 B2 | 1/2006 | Testardi |
| 6,986,069 B2 | 1/2006 | Oehler et al. |
| 7,051,056 B2 | 5/2006 | Rodriguez-Rivera et al. |
| 7,069,465 B2 | 6/2006 | Chu et al. |
| 7,073,017 B2 | 7/2006 | Yamamoto |
| 7,108,339 B2 | 9/2006 | Berger |
| 7,149,858 B1 | 12/2006 | Kiselev |
| 7,171,514 B2 | 1/2007 | Coronado et al. |
| 7,171,668 B2 | 1/2007 | Molloy et al. |
| 7,174,354 B2 | 2/2007 | Andreasson |
| 7,200,144 B2 | 4/2007 | Terrell et al. |
| 7,222,255 B1 | 5/2007 | Claessens et al. |
| 7,237,045 B2 | 6/2007 | Beckmann et al. |
| 7,240,188 B2 | 7/2007 | Takata et al. |
| 7,246,260 B2 | 7/2007 | Brown et al. |
| 7,266,718 B2 | 9/2007 | Idei et al. |
| 7,269,168 B2 | 9/2007 | Roy et al. |
| 7,277,431 B2 | 10/2007 | Walter et al. |
| 7,277,948 B2 | 10/2007 | Igarashi et al. |
| 7,305,658 B1 | 12/2007 | Hamilton et al. |
| 7,328,434 B2 | 2/2008 | Swanson et al. |
| 7,340,555 B2 | 3/2008 | Ashmore et al. |
| 7,346,751 B2 | 3/2008 | Prahlad et al. |
| 7,352,706 B2 | 4/2008 | Klotz et al. |
| 7,353,305 B2 | 4/2008 | Pangal et al. |
| 7,359,321 B1 | 4/2008 | Sindhu et al. |
| 7,383,381 B1 | 6/2008 | Faulkner et al. |
| 7,403,987 B1 | 7/2008 | Marinelli et al. |
| 7,433,326 B2 | 10/2008 | Desai et al. |
| 7,433,948 B2 | 10/2008 | Edsall |
| 7,434,105 B1 | 10/2008 | Rodriguez-Rivera et al. |
| 7,441,154 B2 | 10/2008 | Klotz et al. |
| 7,447,839 B2 | 11/2008 | Uppala |
| 7,487,321 B2 | 2/2009 | Muthiah et al. |
| 7,500,053 B1 | 3/2009 | Kavuri et al. |
| 7,512,744 B2 | 3/2009 | Banga et al. |
| 7,519,004 B1 | 4/2009 | Kamity et al. |
| 7,542,681 B2 | 6/2009 | Cornell et al. |
| 7,558,872 B1 | 7/2009 | Senevirathne et al. |
| 7,587,570 B2 | 9/2009 | Sarkar et al. |
| 7,631,023 B1 | 12/2009 | Kaiser et al. |
| 7,643,505 B1 | 1/2010 | Colloff |
| 7,654,625 B2 | 2/2010 | Amann et al. |
| 7,657,796 B1 | 2/2010 | Kaiser et al. |
| 7,668,981 B1 | 2/2010 | Nagineni et al. |
| 7,669,071 B2 | 2/2010 | Cochran et al. |
| 7,689,384 B1 | 3/2010 | Becker |
| 7,694,092 B2 | 4/2010 | Mizuno |
| 7,697,554 B1 | 4/2010 | Ofer et al. |
| 7,706,303 B2 | 4/2010 | Bose et al. |
| 7,707,481 B2 | 4/2010 | Kirschner et al. |
| 7,716,648 B2 | 5/2010 | Vaidyanathan et al. |
| 7,752,360 B2 | 7/2010 | Galles |
| 7,757,059 B1 | 7/2010 | Ofer et al. |
| 7,774,329 B1 | 8/2010 | Peddy et al. |
| 7,774,839 B2 | 8/2010 | Nazzal |
| 7,793,138 B2 | 9/2010 | Rastogi et al. |
| 7,840,730 B2 | 11/2010 | D'Amato et al. |
| 7,843,906 B1 | 11/2010 | Chidambaram et al. |
| 7,895,428 B2 | 2/2011 | Boland, IV et al. |
| 7,904,599 B1 | 3/2011 | Bennett |
| 7,930,494 B1 | 4/2011 | Goheer et al. |
| 7,975,175 B2 | 7/2011 | Votta et al. |
| 7,979,670 B2 | 7/2011 | Saliba et al. |
| 7,984,259 B1 | 7/2011 | English |
| 8,031,703 B2 | 10/2011 | Gottumukkula et al. |
| 8,032,621 B1 | 10/2011 | Upalekar et al. |
| 8,051,197 B2 | 11/2011 | Mullendore et al. |
| 8,086,755 B2 | 12/2011 | Duffy, IV et al. |
| 8,161,134 B2 | 4/2012 | Mishra et al. |
| 8,196,018 B2 | 6/2012 | Forhan et al. |
| 8,205,951 B2 | 6/2012 | Boks |
| 8,218,538 B1 | 7/2012 | Chidambaram et al. |
| 8,230,066 B2 | 7/2012 | Heil |
| 8,234,377 B2 | 7/2012 | Cohn |
| 8,266,238 B2 | 9/2012 | Zimmer et al. |
| 8,272,104 B2 | 9/2012 | Chen et al. |
| 8,274,993 B2 | 9/2012 | Sharma et al. |

(56) References Cited

U.S. PATENT DOCUMENTS

| | | |
|---|---|---|
| 8,290,919 B1 | 10/2012 | Kelly et al. |
| 8,297,722 B2 | 10/2012 | Chambers et al. |
| 8,301,746 B2 | 10/2012 | Head et al. |
| 8,335,231 B2 | 12/2012 | Kloth et al. |
| 8,341,121 B1 | 12/2012 | Claudatos et al. |
| 8,345,692 B2 | 1/2013 | Smith |
| 8,352,941 B1 | 1/2013 | Protopopov et al. |
| 8,392,760 B2 | 3/2013 | Kandula et al. |
| 8,442,059 B1 | 5/2013 | de la Iglesia et al. |
| 8,479,211 B1 | 7/2013 | Marshall et al. |
| 8,495,356 B2 | 7/2013 | Ashok et al. |
| 8,514,868 B2 | 8/2013 | Hill |
| 8,532,108 B2 | 9/2013 | Li et al. |
| 8,560,663 B2 | 10/2013 | Baucke et al. |
| 8,619,599 B1 | 12/2013 | Even |
| 8,626,891 B2 | 1/2014 | Guru et al. |
| 8,630,983 B2 | 1/2014 | Sengupta et al. |
| 8,660,129 B1 | 2/2014 | Brendel et al. |
| 8,661,299 B1 | 2/2014 | Ip |
| 8,677,485 B2 | 3/2014 | Sharma et al. |
| 8,683,296 B2 | 3/2014 | Anderson et al. |
| 8,706,772 B2 | 4/2014 | Hartig et al. |
| 8,719,804 B2 | 5/2014 | Jain |
| 8,725,854 B2 | 5/2014 | Edsall |
| 8,768,981 B1 | 7/2014 | Milne et al. |
| 8,775,773 B2 | 7/2014 | Acharya et al. |
| 8,793,372 B2 | 7/2014 | Ashok et al. |
| 8,805,918 B1 | 8/2014 | Chandrasekaran et al. |
| 8,805,951 B1 | 8/2014 | Faibish et al. |
| 8,832,330 B1 | 9/2014 | Lancaster |
| 8,855,116 B2 | 10/2014 | Rosset et al. |
| 8,856,339 B2 | 10/2014 | Mestery et al. |
| 8,868,474 B2 | 10/2014 | Leung et al. |
| 8,887,286 B2 | 11/2014 | Dupont et al. |
| 8,898,385 B2 | 11/2014 | Jayaraman et al. |
| 8,909,928 B2 | 12/2014 | Ahmad et al. |
| 8,918,510 B2 | 12/2014 | Gmach et al. |
| 8,918,586 B1 | 12/2014 | Todd et al. |
| 8,924,720 B2 | 12/2014 | Raghuram et al. |
| 8,930,747 B2 | 1/2015 | Levijarvi et al. |
| 8,935,500 B1 | 1/2015 | Gulati et al. |
| 8,949,677 B1 | 2/2015 | Brundage et al. |
| 8,996,837 B1 | 3/2015 | Bono et al. |
| 9,003,086 B1 | 4/2015 | Schuller et al. |
| 9,007,922 B1 | 4/2015 | Mittal et al. |
| 9,009,427 B2 | 4/2015 | Sharma et al. |
| 9,009,704 B2 | 4/2015 | McGrath et al. |
| 9,075,638 B2 | 7/2015 | Barnett et al. |
| 9,141,554 B1 | 9/2015 | Candelaria |
| 9,141,785 B2 | 9/2015 | Mukkara et al. |
| 9,164,795 B1 | 10/2015 | Vincent |
| 9,176,677 B1 | 11/2015 | Fradkin et al. |
| 9,201,704 B2 | 12/2015 | Chang et al. |
| 9,203,784 B2 | 12/2015 | Chang et al. |
| 9,207,882 B2 | 12/2015 | Rosset et al. |
| 9,207,929 B2 | 12/2015 | Katsura |
| 9,213,612 B2 | 12/2015 | Candelaria |
| 9,223,564 B2 | 12/2015 | Munireddy et al. |
| 9,223,634 B2 | 12/2015 | Chang et al. |
| 9,244,761 B2 | 1/2016 | Yekhanin et al. |
| 9,250,969 B2 | 2/2016 | Lagar-Cavilla et al. |
| 9,264,494 B2 | 2/2016 | Factor et al. |
| 9,270,754 B2 | 2/2016 | Iyengar et al. |
| 9,280,487 B2 | 3/2016 | Candelaria |
| 9,304,815 B1 | 4/2016 | Vasanth et al. |
| 9,313,048 B2 | 4/2016 | Chang et al. |
| 9,374,270 B2 | 6/2016 | Nakil et al. |
| 9,378,060 B2 | 6/2016 | Jansson et al. |
| 9,396,251 B1 | 7/2016 | Boudreau et al. |
| 9,448,877 B2 | 9/2016 | Candelaria |
| 9,471,348 B2 | 10/2016 | Zuo et al. |
| 9,501,473 B1 | 11/2016 | Kong et al. |
| 9,503,523 B2 | 11/2016 | Rosset et al. |
| 9,565,110 B2 | 2/2017 | Mullendore et al. |
| 9,575,828 B2 | 2/2017 | Agarwal et al. |
| 9,582,377 B1 | 2/2017 | Dhoolam et al. |
| 9,614,763 B2 | 4/2017 | Dong et al. |
| 9,658,868 B2 | 5/2017 | Hill |
| 9,658,876 B2 | 5/2017 | Chang et al. |
| 9,733,868 B2 | 8/2017 | Chandrasekaran et al. |
| 9,763,518 B2 | 9/2017 | Charest et al. |
| 9,830,240 B2 | 11/2017 | George et al. |
| 9,853,873 B2 | 12/2017 | Dasu et al. |
| 2002/0049980 A1 | 4/2002 | Hoang |
| 2002/0053009 A1 | 5/2002 | Selkirk et al. |
| 2002/0073276 A1 | 6/2002 | Howard et al. |
| 2002/0083120 A1 | 6/2002 | Soltis |
| 2002/0095547 A1 | 7/2002 | Watanabe et al. |
| 2002/0103889 A1 | 8/2002 | Markson et al. |
| 2002/0103943 A1 | 8/2002 | Lo et al. |
| 2002/0112113 A1 | 8/2002 | Karpoff et al. |
| 2002/0120741 A1 | 8/2002 | Webb et al. |
| 2002/0138675 A1 | 9/2002 | Mann |
| 2002/0156971 A1 | 10/2002 | Jones et al. |
| 2003/0023885 A1 | 1/2003 | Potter et al. |
| 2003/0026267 A1 | 2/2003 | Oberman et al. |
| 2003/0055933 A1 | 3/2003 | Ishizaki et al. |
| 2003/0056126 A1 | 3/2003 | O'Connor et al. |
| 2003/0065986 A1 | 4/2003 | Fraenkel et al. |
| 2003/0084359 A1 | 5/2003 | Bresniker et al. |
| 2003/0118053 A1 | 6/2003 | Edsall et al. |
| 2003/0131105 A1 | 7/2003 | Czeiger et al. |
| 2003/0131165 A1 | 7/2003 | Asano et al. |
| 2003/0131182 A1 | 7/2003 | Kumar et al. |
| 2003/0140134 A1 | 7/2003 | Swanson et al. |
| 2003/0140210 A1 | 7/2003 | Testardi |
| 2003/0149763 A1 | 8/2003 | Heitman et al. |
| 2003/0154271 A1 | 8/2003 | Baldwin et al. |
| 2003/0159058 A1 | 8/2003 | Eguchi et al. |
| 2003/0174725 A1 | 9/2003 | Shankar |
| 2003/0189395 A1 | 10/2003 | Doornbos et al. |
| 2003/0210686 A1 | 11/2003 | Terrell et al. |
| 2004/0024961 A1 | 2/2004 | Cochran et al. |
| 2004/0030857 A1 | 2/2004 | Krakirian et al. |
| 2004/0039939 A1 | 2/2004 | Cox et al. |
| 2004/0054776 A1 | 3/2004 | Klotz et al. |
| 2004/0057389 A1 | 3/2004 | Klotz et al. |
| 2004/0059807 A1 | 3/2004 | Klotz et al. |
| 2004/0088574 A1 | 5/2004 | Walter et al. |
| 2004/0117438 A1 | 6/2004 | Considine et al. |
| 2004/0123029 A1 | 6/2004 | Dalai et al. |
| 2004/0128470 A1 | 7/2004 | Hetzler et al. |
| 2004/0128540 A1 | 7/2004 | Roskind |
| 2004/0153863 A1 | 8/2004 | Klotz et al. |
| 2004/0190901 A1 | 9/2004 | Fang |
| 2004/0215749 A1 | 10/2004 | Tsao |
| 2004/0230848 A1 | 11/2004 | Mayo et al. |
| 2004/0250034 A1 | 12/2004 | Yagawa et al. |
| 2005/0033936 A1 | 2/2005 | Nakano et al. |
| 2005/0036499 A1 | 2/2005 | Dutt et al. |
| 2005/0050211 A1 | 3/2005 | Kaul et al. |
| 2005/0050270 A1 | 3/2005 | Horn et al. |
| 2005/0053073 A1 | 3/2005 | Kloth et al. |
| 2005/0055428 A1 | 3/2005 | Terai et al. |
| 2005/0060574 A1 | 3/2005 | Klotz et al. |
| 2005/0060598 A1 | 3/2005 | Klotz et al. |
| 2005/0071851 A1 | 3/2005 | Opheim |
| 2005/0076113 A1 | 4/2005 | Klotz et al. |
| 2005/0083958 A1 | 4/2005 | Drori |
| 2005/0091426 A1 | 4/2005 | Horn et al. |
| 2005/0114611 A1 | 5/2005 | Durham et al. |
| 2005/0114615 A1 | 5/2005 | Ogasawara et al. |
| 2005/0117522 A1 | 6/2005 | Basavaiah et al. |
| 2005/0117562 A1 | 6/2005 | Wrenn |
| 2005/0138287 A1 | 6/2005 | Ogasawara et al. |
| 2005/0169188 A1 | 8/2005 | Cometto et al. |
| 2005/0185597 A1 | 8/2005 | Le et al. |
| 2005/0188170 A1 | 8/2005 | Yamamoto |
| 2005/0198523 A1 | 9/2005 | Shanbhag et al. |
| 2005/0235072 A1 | 10/2005 | Smith et al. |
| 2005/0283658 A1 | 12/2005 | Clark et al. |
| 2006/0015861 A1 | 1/2006 | Takata et al. |
| 2006/0015928 A1 | 1/2006 | Setty et al. |
| 2006/0034302 A1 | 2/2006 | Peterson |

(56) References Cited

U.S. PATENT DOCUMENTS

| | | |
|---|---|---|
| 2006/0045021 A1 | 3/2006 | Deragon et al. |
| 2006/0075191 A1 | 4/2006 | Lolayekar et al. |
| 2006/0098672 A1 | 5/2006 | Schzukin et al. |
| 2006/0117099 A1 | 6/2006 | Mogul |
| 2006/0136684 A1 | 6/2006 | Le et al. |
| 2006/0184287 A1 | 8/2006 | Belady et al. |
| 2006/0198319 A1 | 9/2006 | Schondelmayer et al. |
| 2006/0215297 A1 | 9/2006 | Kikuchi |
| 2006/0221974 A1* | 10/2006 | Hilla ............ H04L 45/60 370/394 |
| 2006/0230227 A1 | 10/2006 | Ogasawara et al. |
| 2006/0242332 A1 | 10/2006 | Johnsen et al. |
| 2006/0251111 A1 | 11/2006 | Kloth et al. |
| 2007/0005297 A1 | 1/2007 | Beresniewicz et al. |
| 2007/0067593 A1 | 3/2007 | Satoyama et al. |
| 2007/0079068 A1 | 4/2007 | Draggon |
| 2007/0091903 A1 | 4/2007 | Atkinson |
| 2007/0094465 A1 | 4/2007 | Sharma et al. |
| 2007/0101202 A1 | 5/2007 | Garbow |
| 2007/0121519 A1 | 5/2007 | Cuni et al. |
| 2007/0136541 A1 | 6/2007 | Herz et al. |
| 2007/0162969 A1 | 7/2007 | Becker |
| 2007/0211640 A1 | 9/2007 | Palacharla et al. |
| 2007/0214316 A1 | 9/2007 | Kim |
| 2007/0250838 A1 | 10/2007 | Belady et al. |
| 2007/0258380 A1 | 11/2007 | Chamdani et al. |
| 2007/0263545 A1 | 11/2007 | Foster et al. |
| 2007/0276884 A1 | 11/2007 | Hara et al. |
| 2007/0283059 A1 | 12/2007 | Ho et al. |
| 2008/0016412 A1 | 1/2008 | White et al. |
| 2008/0034149 A1 | 2/2008 | Sheen |
| 2008/0052459 A1 | 2/2008 | Chang et al. |
| 2008/0059698 A1 | 3/2008 | Kabir et al. |
| 2008/0114933 A1 | 5/2008 | Ogasawara et al. |
| 2008/0126509 A1 | 5/2008 | Subramanian et al. |
| 2008/0126734 A1 | 5/2008 | Murase |
| 2008/0168304 A1 | 7/2008 | Flynn et al. |
| 2008/0201616 A1 | 8/2008 | Ashmore |
| 2008/0244184 A1 | 10/2008 | Lewis et al. |
| 2008/0256082 A1 | 10/2008 | Davies et al. |
| 2008/0267217 A1 | 10/2008 | Colville et al. |
| 2008/0288661 A1 | 11/2008 | Galles |
| 2008/0294888 A1 | 11/2008 | Ando et al. |
| 2009/0063766 A1 | 3/2009 | Matsumura et al. |
| 2009/0083484 A1 | 3/2009 | Basham et al. |
| 2009/0089567 A1 | 4/2009 | Boland, IV et al. |
| 2009/0094380 A1 | 4/2009 | Qiu et al. |
| 2009/0094664 A1 | 4/2009 | Butler et al. |
| 2009/0125694 A1 | 5/2009 | Innan et al. |
| 2009/0193223 A1 | 7/2009 | Saliba et al. |
| 2009/0201926 A1 | 8/2009 | Kagan et al. |
| 2009/0222733 A1 | 9/2009 | Basham et al. |
| 2009/0240873 A1 | 9/2009 | Yu et al. |
| 2009/0282471 A1 | 11/2009 | Green et al. |
| 2009/0300209 A1* | 12/2009 | Elzur ............ H04L 47/24 709/234 |
| 2009/0323706 A1 | 12/2009 | Germain et al. |
| 2010/0011365 A1 | 1/2010 | Gerovac et al. |
| 2010/0030995 A1 | 2/2010 | Wang et al. |
| 2010/0046378 A1 | 2/2010 | Knapp et al. |
| 2010/0083055 A1 | 4/2010 | Ozonat |
| 2010/0174968 A1 | 7/2010 | Charles et al. |
| 2010/0318609 A1 | 12/2010 | Lahiri et al. |
| 2010/0318837 A1 | 12/2010 | Murphy et al. |
| 2011/0010394 A1 | 1/2011 | Carew et al. |
| 2011/0022691 A1 | 1/2011 | Banerjee et al. |
| 2011/0029824 A1 | 2/2011 | Schöler et al. |
| 2011/0035494 A1 | 2/2011 | Pandey et al. |
| 2011/0075667 A1 | 3/2011 | Li et al. |
| 2011/0087848 A1 | 4/2011 | Trent |
| 2011/0119556 A1 | 5/2011 | de Buen |
| 2011/0142053 A1 | 6/2011 | Van Der Merwe et al. |
| 2011/0161496 A1 | 6/2011 | Nicklin |
| 2011/0173303 A1 | 7/2011 | Rider |
| 2011/0228679 A1 | 9/2011 | Varma et al. |
| 2011/0231899 A1 | 9/2011 | Pulier et al. |
| 2011/0239039 A1 | 9/2011 | Dieffenbach et al. |
| 2011/0252274 A1 | 10/2011 | Kawaguchi et al. |
| 2011/0255540 A1 | 10/2011 | Mizrahi et al. |
| 2011/0276584 A1 | 11/2011 | Cotner et al. |
| 2011/0276675 A1 | 11/2011 | Singh et al. |
| 2011/0276951 A1 | 11/2011 | Jain |
| 2011/0299539 A1 | 12/2011 | Rajagopal et al. |
| 2011/0307450 A1 | 12/2011 | Hahn et al. |
| 2011/0313973 A1 | 12/2011 | Srivas et al. |
| 2012/0011255 A1* | 1/2012 | Kusama ............ H04L 67/1031 709/226 |
| 2012/0023319 A1 | 1/2012 | Chin et al. |
| 2012/0030401 A1 | 2/2012 | Cowan et al. |
| 2012/0054367 A1 | 3/2012 | Ramakrishnan et al. |
| 2012/0072578 A1 | 3/2012 | Alam |
| 2012/0072985 A1 | 3/2012 | Davne et al. |
| 2012/0075999 A1 | 3/2012 | Ko et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0130874 A1 | 5/2012 | Mane et al. |
| 2012/0131174 A1 | 5/2012 | Ferris et al. |
| 2012/0134672 A1 | 5/2012 | Banerjee |
| 2012/0144014 A1 | 6/2012 | Natham et al. |
| 2012/0159112 A1 | 6/2012 | Tokusho et al. |
| 2012/0167094 A1 | 6/2012 | Suit |
| 2012/0173581 A1 | 7/2012 | Hartig et al. |
| 2012/0173589 A1 | 7/2012 | Kwon et al. |
| 2012/0177039 A1 | 7/2012 | Berman |
| 2012/0177041 A1 | 7/2012 | Berman |
| 2012/0177042 A1 | 7/2012 | Berman |
| 2012/0177043 A1 | 7/2012 | Berman |
| 2012/0177044 A1 | 7/2012 | Berman |
| 2012/0177045 A1 | 7/2012 | Berman |
| 2012/0177370 A1 | 7/2012 | Berman |
| 2012/0179909 A1 | 7/2012 | Sagi et al. |
| 2012/0201138 A1 | 8/2012 | Yu et al. |
| 2012/0210041 A1 | 8/2012 | Flynn et al. |
| 2012/0254440 A1 | 10/2012 | Wang |
| 2012/0257501 A1 | 10/2012 | Kucharczyk |
| 2012/0265976 A1 | 10/2012 | Spiers et al. |
| 2012/0281706 A1 | 11/2012 | Agarwal et al. |
| 2012/0297088 A1 | 11/2012 | Wang et al. |
| 2012/0303618 A1 | 11/2012 | Dutta et al. |
| 2012/0311106 A1 | 12/2012 | Morgan |
| 2012/0311568 A1 | 12/2012 | Jansen |
| 2012/0320788 A1 | 12/2012 | Venkataramanan et al. |
| 2012/0324114 A1 | 12/2012 | Dutta et al. |
| 2012/0331119 A1 | 12/2012 | Bose et al. |
| 2013/0003737 A1 | 1/2013 | Sinicrope |
| 2013/0013664 A1 | 1/2013 | Baird et al. |
| 2013/0028135 A1 | 1/2013 | Berman |
| 2013/0036212 A1 | 2/2013 | Jibbe et al. |
| 2013/0036213 A1 | 2/2013 | Hasan et al. |
| 2013/0036449 A1 | 2/2013 | Mukkara et al. |
| 2013/0054888 A1 | 2/2013 | Bhat et al. |
| 2013/0061089 A1 | 3/2013 | Valiyaparambil et al. |
| 2013/0067162 A1 | 3/2013 | Jayaraman et al. |
| 2013/0080823 A1 | 3/2013 | Roth et al. |
| 2013/0086340 A1 | 4/2013 | Fleming et al. |
| 2013/0100858 A1 | 4/2013 | Kamath et al. |
| 2013/0111540 A1 | 5/2013 | Sabin |
| 2013/0138816 A1 | 5/2013 | Kuo et al. |
| 2013/0138836 A1 | 5/2013 | Cohen et al. |
| 2013/0139138 A1 | 5/2013 | Kakos |
| 2013/0144933 A1 | 6/2013 | Hinni et al. |
| 2013/0152076 A1 | 6/2013 | Patel |
| 2013/0152175 A1 | 6/2013 | Hromoko et al. |
| 2013/0163426 A1 | 6/2013 | Beliveau et al. |
| 2013/0163606 A1 | 6/2013 | Bagepalli et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0185451 A1* | 7/2013 | Gelter ............ H04L 47/74 709/231 |
| 2013/0191106 A1 | 7/2013 | Kephart et al. |
| 2013/0198730 A1 | 8/2013 | Munireddy et al. |
| 2013/0208888 A1 | 8/2013 | Agrawal et al. |

(56) References Cited

U.S. PATENT DOCUMENTS

| | | |
|---|---|---|
| 2013/0212130 A1 | 8/2013 | Rahnama |
| 2013/0223236 A1 | 8/2013 | Dickey |
| 2013/0238641 A1 | 9/2013 | Mandelstein et al. |
| 2013/0246552 A1 | 9/2013 | Underwood et al. |
| 2013/0266307 A1 | 10/2013 | Garg et al. |
| 2013/0268922 A1 | 10/2013 | Tiwari et al. |
| 2013/0275470 A1 | 10/2013 | Cao et al. |
| 2013/0297655 A1 | 11/2013 | Narasayya et al. |
| 2013/0297769 A1 | 11/2013 | Chang et al. |
| 2013/0318134 A1 | 11/2013 | Bolik et al. |
| 2013/0318288 A1 | 11/2013 | Khan et al. |
| 2014/0006708 A1 | 1/2014 | Huynh et al. |
| 2014/0016493 A1 | 1/2014 | Johnsson et al. |
| 2014/0019684 A1 | 1/2014 | Wei et al. |
| 2014/0025770 A1 | 1/2014 | Warfield et al. |
| 2014/0029441 A1 | 1/2014 | Nydell |
| 2014/0029442 A1 | 1/2014 | Wallman |
| 2014/0039683 A1 | 2/2014 | Zimmermann et al. |
| 2014/0040473 A1 | 2/2014 | Ho et al. |
| 2014/0040883 A1 | 2/2014 | Tompkins |
| 2014/0047201 A1 | 2/2014 | Mehta |
| 2014/0053264 A1 | 2/2014 | Dubrovsky et al. |
| 2014/0059187 A1 | 2/2014 | Rosset et al. |
| 2014/0059266 A1 | 2/2014 | Ben-Michael et al. |
| 2014/0086253 A1 | 3/2014 | Yong |
| 2014/0089273 A1 | 3/2014 | Borshack et al. |
| 2014/0095556 A1 | 4/2014 | Lee et al. |
| 2014/0096249 A1 | 4/2014 | Dupont et al. |
| 2014/0105009 A1 | 4/2014 | Vos et al. |
| 2014/0108474 A1 | 4/2014 | David et al. |
| 2014/0109071 A1 | 4/2014 | Ding et al. |
| 2014/0112122 A1 | 4/2014 | Kapadia et al. |
| 2014/0123207 A1 | 5/2014 | Agarwal et al. |
| 2014/0156557 A1 | 6/2014 | Zeng et al. |
| 2014/0164666 A1 | 6/2014 | Yand |
| 2014/0164866 A1 | 6/2014 | Bolotov et al. |
| 2014/0172371 A1 | 6/2014 | Zhu et al. |
| 2014/0173060 A1 | 6/2014 | Jubran et al. |
| 2014/0173195 A1 | 6/2014 | Rosset et al. |
| 2014/0173579 A1 | 6/2014 | McDonald et al. |
| 2014/0189278 A1 | 7/2014 | Peng |
| 2014/0195712 A1* | 7/2014 | Ryu ............... G06F 13/4022 710/313 |
| 2014/0198794 A1 | 7/2014 | Mehta et al. |
| 2014/0211661 A1 | 7/2014 | Gorkemli et al. |
| 2014/0215265 A1 | 7/2014 | Mohanta et al. |
| 2014/0215590 A1 | 7/2014 | Brand |
| 2014/0219086 A1 | 8/2014 | Cantu' et al. |
| 2014/0222953 A1 | 8/2014 | Karve et al. |
| 2014/0229790 A1 | 8/2014 | Goss et al. |
| 2014/0244585 A1 | 8/2014 | Sivasubramanian et al. |
| 2014/0244897 A1 | 8/2014 | Goss et al. |
| 2014/0245435 A1 | 8/2014 | Belenky |
| 2014/0269390 A1 | 9/2014 | Ciodaru et al. |
| 2014/0281700 A1 | 9/2014 | Nagesharao et al. |
| 2014/0297941 A1 | 10/2014 | Rajani et al. |
| 2014/0307578 A1 | 10/2014 | Desanti |
| 2014/0317206 A1 | 10/2014 | Lomelino et al. |
| 2014/0324862 A1 | 10/2014 | Bingham et al. |
| 2014/0325208 A1 | 10/2014 | Resch et al. |
| 2014/0331276 A1 | 11/2014 | Frascadore et al. |
| 2014/0348166 A1 | 11/2014 | Yang et al. |
| 2014/0355450 A1 | 12/2014 | Bhikkaji et al. |
| 2014/0366155 A1 | 12/2014 | Chang et al. |
| 2014/0376550 A1 | 12/2014 | Khan et al. |
| 2015/0003450 A1 | 1/2015 | Salam et al. |
| 2015/0003458 A1 | 1/2015 | Li et al. |
| 2015/0003463 A1 | 1/2015 | Li et al. |
| 2015/0010001 A1 | 1/2015 | Duda et al. |
| 2015/0016461 A1 | 1/2015 | Qiang |
| 2015/0030024 A1 | 1/2015 | Venkataswami et al. |
| 2015/0046123 A1 | 2/2015 | Kato |
| 2015/0063353 A1 | 3/2015 | Kapadia et al. |
| 2015/0067001 A1 | 3/2015 | Koltsidas |
| 2015/0082432 A1 | 3/2015 | Eaton et al. |
| 2015/0092824 A1 | 4/2015 | Wicker, Jr. et al. |
| 2015/0120907 A1 | 4/2015 | Niestemski et al. |
| 2015/0121131 A1 | 4/2015 | Kiselev et al. |
| 2015/0127979 A1 | 5/2015 | Doppalapudi |
| 2015/0142840 A1 | 5/2015 | Baldwin et al. |
| 2015/0169313 A1 | 6/2015 | Katsura |
| 2015/0180672 A1 | 6/2015 | Kuwata |
| 2015/0205974 A1 | 7/2015 | Talley et al. |
| 2015/0207763 A1 | 7/2015 | Bertran Ortiz et al. |
| 2015/0222444 A1 | 8/2015 | Sarkar |
| 2015/0229546 A1 | 8/2015 | Somaiya et al. |
| 2015/0248366 A1 | 9/2015 | Bergsten et al. |
| 2015/0248418 A1 | 9/2015 | Bhardwaj et al. |
| 2015/0254003 A1 | 9/2015 | Lee et al. |
| 2015/0254088 A1 | 9/2015 | Chou et al. |
| 2015/0261446 A1 | 9/2015 | Lee |
| 2015/0263978 A1* | 9/2015 | Olson ............... G06F 3/061 709/226 |
| 2015/0263993 A1 | 9/2015 | Kuch et al. |
| 2015/0269048 A1 | 9/2015 | Marr et al. |
| 2015/0277804 A1 | 10/2015 | Arnold et al. |
| 2015/0281067 A1 | 10/2015 | Wu |
| 2015/0303949 A1 | 10/2015 | Jafarkhani et al. |
| 2015/0341237 A1 | 11/2015 | Cuni et al. |
| 2015/0341239 A1 | 11/2015 | Bertran Ortiz et al. |
| 2015/0358136 A1 | 12/2015 | Medard |
| 2015/0379150 A1 | 12/2015 | Duda |
| 2016/0004611 A1 | 1/2016 | Lakshman et al. |
| 2016/0011936 A1 | 1/2016 | Luby |
| 2016/0011942 A1 | 1/2016 | Golbourn et al. |
| 2016/0054922 A1 | 2/2016 | Awasthi et al. |
| 2016/0062820 A1 | 3/2016 | Jones et al. |
| 2016/0070652 A1 | 3/2016 | Sundararaman et al. |
| 2016/0087885 A1 | 3/2016 | Tripathi et al. |
| 2016/0088083 A1 | 3/2016 | Bharadwaj et al. |
| 2016/0119159 A1 | 4/2016 | Zhao et al. |
| 2016/0119421 A1 | 4/2016 | Semke et al. |
| 2016/0139820 A1 | 5/2016 | Fluman et al. |
| 2016/0149639 A1 | 5/2016 | Pham et al. |
| 2016/0205189 A1 | 7/2016 | Mopur et al. |
| 2016/0210161 A1 | 7/2016 | Rosset et al. |
| 2016/0231928 A1 | 8/2016 | Lewis et al. |
| 2016/0274926 A1 | 9/2016 | Narasimhamurthy et al. |
| 2016/0285760 A1 | 9/2016 | Dong |
| 2016/0292359 A1 | 10/2016 | Tellis et al. |
| 2016/0294983 A1 | 10/2016 | Kliteynik et al. |
| 2016/0334998 A1 | 11/2016 | George et al. |
| 2016/0366094 A1 | 12/2016 | Mason et al. |
| 2016/0378624 A1 | 12/2016 | Jenkins, Jr. et al. |
| 2016/0380694 A1 | 12/2016 | Guduru |
| 2017/0010874 A1 | 1/2017 | Rosset |
| 2017/0010930 A1 | 1/2017 | Dutta et al. |
| 2017/0019475 A1 | 1/2017 | Metz et al. |
| 2017/0068630 A1 | 3/2017 | Iskandar et al. |
| 2017/0168970 A1 | 6/2017 | Sajeepa et al. |
| 2017/0177860 A1 | 6/2017 | Suarez et al. |
| 2017/0212858 A1 | 7/2017 | Chu et al. |
| 2017/0273019 A1 | 9/2017 | Park et al. |
| 2017/0277655 A1 | 9/2017 | Das et al. |
| 2017/0337097 A1 | 11/2017 | Sipos et al. |
| 2017/0340113 A1 | 11/2017 | Charest et al. |
| 2017/0371558 A1 | 12/2017 | George et al. |
| 2018/0097707 A1 | 4/2018 | Wright et al. |

FOREIGN PATENT DOCUMENTS

| | | |
|---|---|---|
| EP | 2680155 | 1/2014 |
| GB | 2350028 | 5/2001 |
| JP | 2000-242434 | 9/2000 |
| TW | 1566104 | 1/2017 |
| WO | WO 2004/077214 | 9/2004 |
| WO | 2009146165 A1 | 12/2009 |

(56) References Cited

FOREIGN PATENT DOCUMENTS

| WO | WO 2016/003408 | 1/2016 |
|---|---|---|
| WO | WO 2016/003489 | 1/2016 |

OTHER PUBLICATIONS

Author Unknown, "5 Benefits of a Storage Gateway in the Cloud," Blog, TwinStrata, Inc., posted Jul. 10, 2012, 4 pages, hftps://web.archive.org/web/20120725092619/http://blog.twinstrata.com/2012/07/10//5-benefits-of-a-storage-gateway-in-the-cloud.

Author Unknown, "Configuration Interface for IBM System Storage DS5000, IBM DS4000, and IBM DS3000 Systems," IBM SAN Volume Controller Version 7.1, IBM® System Storage® SAN Volume Controller Information Center, Jun. 16, 2013, 3 pages.

Author Unknown, "Coraid EtherCloud, Software-Defined Storage with Scale-Out Infrastructure," Solution Brief, 2013, 2 pages, Coraid, Redwood City, California, U.S.A.

Author Unknown, "Coraid Virtual DAS (VDAS) Technology: Eliminate Tradeoffs between DAS and Networked Storage," Coraid Technology Brief, ©2013 Cora id, Inc., Published on or about Mar. 20, 2013, 2 pages.

Author Unknown, "Creating Performance-based SAN SLAs Using Finisar's NetWisdom" May 2006, 7 pages, Finisar Corporation, Sunnyvale, California, U.S.A.

Author Unknown, "Data Center, Metro Cloud Connectivity: Integrated Metro SAN Connectivity in 16 Gbps Switches," Brocade Communication Systems, Inc., Apr. 2011, 14 pages.

Author Unknown, "Data Center, SAN Fabric Administration Best Practices Guide, Support Perspective," Brocade Communication Systems, Inc., May 2013, 21 pages.

Author Unknown, "delphi—Save a CRC Stack Overflow, value in a file, without altering the actual CRC Checksum?" Stack Overflow, stackoverflow.com, Dec. 23, 2011, XP055130879, 3 pages http://stackoverflow.com/questions/8608219/save-a-crc-value-in-a-file-wihout-altering-the-actual-crc-checksum.

Author Unknown, "EMC UNISPHERE: Innovative Approach to Managing Low-End and Midrange Storage; Redefining Simplicity in the Entry-Level and Midrange Storage Markets," Data Sheet, EMC Corporation; published on or about Jan. 4, 2013 [Retrieved and printed Sep. 12, 2013] 6 pages http://www.emc.com/storage/vnx/unisphere.htm.

Author Unknown, "HP XP Array Manager Software—Overview & Features," Storage Device Management Software; Hewlett-Packard Development Company, 3 pages; © 2013 Hewlett-Packard Development Company, L.P.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

Author Unknown, "Network Transformation with Software-Defined Networking and Ethernet Fabrics," Positioning Paper, 2012, 6 pages, Brocade Communications Systems.

Author Unknown, "Recreating Real Application Traffic in Junosphere Lab," Solution Brief, Juniper Networks, Dec. 2011, 3 pages.

Author Unknown, "Shunra for HP Softwarer, Enabiling Confidence in Application Performance Before Deployment," 2010, 2 pages.

Author Unknown, "Software Defined Networking: The New Norm for Networks," White Paper, Open Networking Foundation, Apr. 13, 2012, 12 pages.

Author Unknown, "Software Defined Storage Networks an Introduction," White Paper, Doc # 01-000030-001 Rev. A, Dec. 12, 2012, 8 pages; Jeda Networks, Newport Beach, California, U.S.A.

Author Unknown, "Standard RAID Levels," Wikipedia, the Free Encyclopedia, last updated Jul. 18, 2014, 7 pages; http://en.wikipedia.org/wiki/Standard_RAID_levels.

Author Unknown, "Storage Area Network—NPIV: Emulex Virtual HBA and Brocade, Proven Interoperability and Proven Solution," Technical Brief, Apr. 2008, 4 pages, Emulex and Brocade Communications Systems.

Author Unknown, "Storage Infrastructure for the Cloud," Solution Brief, © 2012, 3 pages; coraid, Redwood City, California, U.S.A.

Author Unknown, "The Fundamentals of Software-Defined Storage, Simplicity at Scale for Cloud-Architectures" Solution Brief, 2013, 3 pages; Coraid, Redwood City, California, U.S.A.

Author Unknown, "VirtualWisdom® SAN Performance Probe Family Models: Probe FC8, HD, and HD48," Virtual Instruments Data Sheet, Apr. 2014 Virtual Instruments. All Rights Reserved; 4 pages.

Author Unknown, "Xgig Analyzer: Quick Start Feature Guide 4.0," Feb. 2008, 24 pages, Finisar Corporation, Sunnyvale, California, U.S.A.

Author Unknown, "Sun Storage Common Array Manager Installation and Setup Guide," Software Installation and Setup Guide Version 6.7.x 821-1362-10, Appendix D: Configuring In-Band Management, Sun Oracle; retrieved and printed Sep. 12, 2013, 15 pages.

Author Unknown, "Vblock Solution for SAP: Simplified Provisioning for Operation Efficiency," VCE White Paper, Vce—The Virtual Computing Environment Company, Aug. 2011, 11 pages.

Aweya, James, et al., "Multi-level active queue management with dynamic thresholds," Elsevier, Computer Communications 25 (2002) pp. 756-771.

Berman, Stuart, et al., "Start-Up Jeda Networks in Software Defined Storage Network Technology," Press Release, Feb. 25, 2013, 2 pages, http://www.storagenewsletter.com/news/startups/jeda-networks.

Borovick, Lucinda, et al., "White Paper, Architecting the Network for the Cloud," IDC Analyze the Future, Jan. 2011, pp. 1-8.

Chakrabarti, Kaushik, et al., "Locally Adaptive Dimensionality Reduction for Indexing Large Time Series Databases," ACM Transactions on Database Systems, vol. 27, No. 2, Jun. 2009, pp. 188-228.

Chandola, Varun, et al., "A Gaussian Process Based Online Change Detection Algorithm for Monitoring Periodic Time Series," Proceedings of the Eleventh SIAM International Conference on Data Mining, SDM 2011, Apr. 28-30, 2011, 12 pages.

Cisco Systems, Inc. "N-Port Virtualization in the Data Center," Cisco White Paper, Cisco Systems, Inc., Mar. 2008, 7 pages.

Cisco Systems, Inc., "Best Practices in Deploying Cisco Nexus 1000V Series Switches on Cisco UCS B and C Series Cisco UCS Manager Servers," White Paper, Cisco Systems, Inc., Apr. 2011, 36 pages.

Cisco Systems, Inc., "Cisco Prime Data Center Network Manager 6.1," At-A-Glance, © 2012, 3 pages.

Cisco Systems, Inc., "Cisco Prime Data Center Network Manager," Release 6.1 Data Sheet, © 2012, 10 pages.

Cisco Systems, Inc., "Cisco Unified Network Services: Overcome Obstacles to Cloud-Ready Deployments," White Paper, Cisco Systems, Inc., Jan. 2011, 6 pages.

Clarke, Alan, et al., "Open Data Center Alliance Usage: Virtual Machine (VM) Interoperability in a Hybrid Cloud Environment Rev. 1.2," Open Data Center Alliance, Inc., 2013, pp. 1-18.

Cummings, Roger, et al., Fibre Channel—Fabric Generic Requirements (FC-FG), Dec. 4, 1996, 33 pages, American National Standards Institute, Inc., New York, New York, U.S.A.

Farber, Franz, et al. "An In-Memory Database System for Multi-Tenant Applications," Proceedings of 14th Business, Technology and Web (BWT) Conference on Database Systems for Business, Technology, and Web, Feb. 28 to Mar. 4, 2011, 17 pages, University of Kaiserslautern, Germany.

Guo, Chang Jie, et al., "IBM Resarch Report: Data Integration and Composite Business Services, Part 3, Building a Multi-Tenant Data Tier with with [sic] Access Control and Security," RC24426 (C0711-037), Nov. 19, 2007, 20 pages, IBM.

Hatzieleftheriou, Andromachi, et al., "Host-side Filesystem Journaling for Durable Shared Storage," 13th USENIX Conference on File and Storage Technologies (Fast '15), Feb. 16-19, 2015, 9 pages; https://www.usenix.org/system/files/conference/fast15/fast15-paper-hatzieleftheriou.pdf.

Hedayat, K., et al., "A Two-Way Active Measurement Protocol (TWAMP)," Network Working Group, RFC 5357, Oct. 2008, 26 pages.

Horn, C., et al., "Online anomaly detection with expert system feedback in social networks," 2011 IEEE International Conference

(56) References Cited

OTHER PUBLICATIONS on Acoustics, Speech and Signal Processing (ICASSP), May 22-27, 2011, 2 pages, Prague; [Abstract only].
Hosterman, Cody, et al., "Using EMC Symmetrix Storage inVMware vSph ere Environments," Version 8.0, EMC²Techbooks, EMC Corporation; published on or about Jul. 8, 2008, 314 pages; [Retrieved and printed Sep. 12, 2013].
Hu, Yuchong, et al., "Cooperative Recovery of Distributed Storage Systems from Multiple Losses with Network Coding," University of Science & Technology of China, Feb. 2010, 9 pages.
Keogh, Eamonn, et al., "Dimensionality Reduction for Fast Similarity Search in Large Time Series Databases," KAIS Long Paper submitted May 16, 2000; 19 pages.
Kolyshkin, Kirill, "Virtualization in Linux," Sep. 1, 2006, pp. 1-5.
Kovar, Joseph F., "Startup Jeda Networks Takes SDN Approach to Storage Networks," CRN Press Release, Feb. 22, 2013, 1 page, http://www.crn.com/240149244/printablearticle.htm.
Lampson, Butler, W., et al., "Crash Recovery in a Distributed Data Storage System," Jun. 1, 1979, 28 pages.
Lewis, Michael E., et al., "Design of an Advanced Development Model Optical Disk-Based Redundant Array of Independent Disks (RAID) High Speed Mass Storage Subsystem," Final Technical Report, Oct. 1997, pp. 1-211.
Lin, Jessica, "Finding Motifs in Time Series," SIGKDD'02 Jul. 23,-26, 2002, 11 pages, Edmonton, Alberta, Canada.
Linthicum, David, "VM Import could be a game changer for hybrid clouds", InfoWorld, Dec. 23, 2010, 4 pages.
Long, Abraham Jr., "Modeling the Reliability of RAID Sets," Dell Power Solutions, May 2008, 4 pages.
Ma, AO, et al., "RAIDShield: Characterizing, Monitoring, and Proactively Protecting Against Disk Failures," Fast '15, 13$^{th}$ USENIX Conference on File and Storage Technologies, Feb. 16-19, 2015, 17 pages, Santa Clara, California, U.S.A.
Mahalingam, M., et al., "Virtual eXtensible Local Area Network (VXLAN): A Framework for Overlaying Virtualized Layer 2 Networks over Layer 3 Networks," Independent Submission, RFC 7348, Aug. 2014, 22 pages; http://www.hip.at/doc/rfc/rfc7348.html.
Monia, Charles, et al., IFCP—A Protocol for Internet Fibre Channel Networking, draft-monia-ips-ifcp-00.txt, Dec. 12, 2000, 6 pages.
Mueen, Abdullah, et al., "Online Discovery and Maintenance of Time Series Motifs," KDD'10 The 16th ACM SIGKDD International Conference on Knowledge Discovery and Data Mining, Jul. 25-28, 2010, 10 pages, Washington, DC, U.S.A.
Muglia, Bob, "Decoding SDN," Jan. 14, 2013, Juniper Networks, pp. 1-7, http://forums.juniper.net/t5/The-New-Network/Decoding-SDN/ba-p/174651.
Murray, Joseph F., et al., "Machine Learning Methods for Predicting Failures in Hard Drives: A Multiple-Instance Application," Journal of Machine Learning Research 6 (2005), pp. 783-816; May 2005, 34 pages.
Nelson, Mark, "File Verification Using CRC," Dr. Dobb's Journal, May 1, 1992, pp. 1-18, XP055130883.
Pace, Alberto, "Technologies for Large Data Management in Scientific Computing," International Journal of Modern Physics C., vol. 25, No. 2, Feb. 2014, 72 pages.
Petersen, Chris, "Introducing Lightning: A flexible NVMe JBOF," Mar. 9, 2016, 6 pages.
Pinheiro, Eduardo, et al., "Failure Trends in a Large Disk Drive Population," Fast '07, 5$^{th}$ USENIX Conference on File and Storage Technologies, Feb. 13-16, 2007, 13 pages, San Jose, California, U.S.A.

Raginsky, Maxim, et al., "Sequential Anomaly Detection in the Presence of Noise and Limited Feedback," arXiv:0911.2904v4 [cs.LG] Mar. 13, 2012, 19 pages.
Saidi, Ali G., et al., "Performance Validation of Network-Intensive Workloads on a Full-System Simulator," Interaction between Operating System and Computer Architecture Workshop, (IOSCA 2005), Austin, Texas, Oct. 2005, 10 pages.
Sajassi, A., et al., "BGP MPLS Based Ethernet VPN," Network Working Group, Oct. 18, 2014, 52 pages.
Sajassi, Ali, et al., "A Network Virtualization Overlay Solution using EVPN," L2VPN Workgroup, Nov. 10, 2014, 24 pages; http://tools.ietf.org/pdf/draft-ietf-bess-evpn-overlay-00.pdf.
Sajassi, Ali, et al., "Integrated Routing and Bridging in EVPN," L2VPN Workgroup, Nov. 11, 2014, 26 pages; http://tools.ietf.org/pdf/draft-ietf-bess-evpn-inter-subnet-forwardind-00.pdf.
Schroeder, Bianca, et al., "Disk failures in the real world: What does an MTTF of 1,000,000 hours mean to you?" Fast '07: 5$^{th}$ USENIX Conference on File and Storage Technologies, Feb. 13-16, 2007, 16 pages, San Jose, California, U.S.A.
Shue, David, et al., "Performance Isolation and Fairness for Multi-Tenant Cloud Storage," USENIX Association, 10$^{th}$ USENIX Symposium on Operating Systems Design Implementation (OSDI '12), 2012, 14 pages; https://www.usenix.org/system/files/conference/osdi12/osdi12-final-215.pdf.
Staimer, Marc, "Inside Cisco Systems' Unified Computing System," Dragon Slayer Consulting, Jul. 2009, 5 pages.
Stamey, John, et al., "Client-Side Dynamic Metadata in Web 2.0," SIGDOC '07, Oct. 22-24, 2007, pp. 155-161.
Swami, Vijay, "Simplifying SAN Management for VMWare Boot from SAN, Utilizing Cisco UCS and Palo," posted May 31, 2011, 6 pages.
Tate, Jon, et al., "Introduction to Storage Area Networks and System Networking," Dec. 2017, 302 pages, ibm.com/redbooks.
Vuppala, Vibhavasu, et al., "Layer-3 Switching Using Virtual Network Ports," Computer Communications and Networks, 1999, Proceedings, Eight International Conference in Boston, MA, USA, Oct. 11-13, 1999, Piscataway, NJ, USA, IEEE, ISBN: 0-7803-5794-9, pp. 642-648.
Wang, Feng, et al. "OBFS: A File System for Object-Based Storage Devices," Storage System Research Center, MSST. vol. 4., Apr. 2004, 18 pages.
Weil, Sage A., "CEPH: Reliable, Scalable, and High-Performance Distributed Storage," Dec. 2007, 239 pages, University of California, Santa Cruz.
Weil, Sage A., et al. "ceph: a Scalable, High-performance Distributed File System," Proceedings of the 7th symposium on Operating systems design and implementation. USENIX Association, Nov. 6, 2006, 14 pages.
Weil, Sage A., et al. "CRUSH: Controlled, Scalable, Decentralized Placement of Replicated Data." Proceedings of the 2006 ACM/IEEE conference on Supercomputing. ACM, Nov. 11, 2006, 12 pages.
Wu, Joel, et al., "The Design, and Implementation of AQuA: An Adaptive Quality of Service Aware Object-Based Storage Device," Department of Computer Science, MSST, May 17, 2006, 25 pages; http://storageconference.us/2006/Presentations/30Wu.pdf.
Xue, Chendi, et al. "A Standard framework for Ceph performance profiling with latency breakdown," CEPH, Jun. 30, 2015, 3 pages.
Zhou, Zihan, et al., "Stable Principal Component Pursuit," arXiv:1001.2363v1 [cs.It], Jan. 14, 2010, 5 pages.
Zhu, Yunfeng, et al., "A Cost-based Heterogeneous Recovery Scheme for Distributed Storage Systems with RAID-6 Codes," University of Science & Technology of China, 2012, 12 pages.

\* cited by examiner

|  | FILTER | FILTER ID | ACTION |
|---|---|---|---|
| SCSI CMD FILTER | DA=0xAAAAAAAAAAAA<br>SA=0xBBBBBBBBBBBB<br>ETH TYPE=0xFFFF | 1 | FLOW TABLE LOOKUP |
| SCSI RSP FILTER | DA=0xBBBBBBBBBBBB<br>SA=0xAAAAAAAAAAAA<br>ETH TYPE=0xFFFF | 2 | FLOW TABLE LOOKUP |
|  | DA=0xBBBBBBBBBBBB<br>SA=0xAAAAAAAAAAAA<br>ETH TYPE=0xFFFE | 3 | FLOW TABLE LOOKUP |

FIG. 7

| BITS | 15 | 14 | 13 | 12 | 11 | 10-0 (11BITS) |
|------|----|----|----|----|----|----------------|
|      | RESERVED ||| FILTER ID || LIF ID |

| WORD/BYTE | 0 | 1 | 2 | 3 | |
|-----------|---|---|---|---|---|
| 1 | STATE | PRIORITY | POLICY TYPE || 106 |
| 2 | STARVE COUNTER |||| 108 |
| 3 | OUTSTANDING TOKENS |||| 110 |
| 4 | MAXIMUM THRESHOLD TOKENS |||| 112 |
| 5 | MINIMUM THRESHOLD TOKENS |||| 114 |
| 6 | MAXIMUM IOPS |||| 116 |

| KEY (2 BYTES) | PACKET COUNT (4 BYTES) | TOTAL IO BYTES (8 BYTES) | IOPS (4 BYTES) | sNIC POLICY CONTEXT | REWRITE RULE | STEERING ACTION |
|---|---|---|---|---|---|---|
| 00001<LIF id-x>FT ENTRY FOR CMD | TOTAL COMMAND COUNT FOR sNIC-1 | | IOPS FOR sNIC-1 | QoS POLICY CTXT FOR sNIC-1 | ARBITER REWRITE RULE FOR CMD | FORWARD PACKET TO RQx |
| 00001<LIF id-y>FT ENTRY FOR CMD | TOTAL COMMAND COUNT FOR sNIC-y | | IOPS FOR sNIC-y | QoS POLICY CTXT FOR sNIC-y | ARBITER REWRITE RULE FOR CMD | FORWARD PACKET TO RQy |
| ooo | ooo | ooo | ooo | ooo | ooo | ooo |
| 00002<LIF id-x>FT ENTRY FOR RSP | TOTAL COMPLETION COUNT FOR sNIC-1 | TOTAL BYTES TRANSFERRED FOR sNIC-1 | | ADDRESS OF QoS POLICY CTXT FOR sNIC-1 | ARBITER REWRITE RULE FOR RSP | FORWARD PACKET TO RQ ON Host-1 |
| 00002<LIF id-y>FT ENTRY FOR RSP | TOTAL COMPLETION COUNT FOR sNIC-y | TOTAL BYTES TRANSFERRED FOR sNIC-y | | ADDRESS OF QoS POLICY CTX FOR sNIC-y | ARBITER REWRITE RULE FOR RSP | FORWARD PACKET TO RQ ON Host-y |
| ooo | ooo | ooo | ooo | ooo | ooo | ooo |
| 00003<LIF id-x>FT ENTRY FOR BUSY RSP | TOTAL NUMBER OF COMMANDS BUSIED FOR sNIC-1 | | | | DECAP REWRITE RULE | FORWARD PACKET TO RQ ON Host-1 |
| 00003<LIF id-y>FT ENTRY FOR BUSY RSP | TOTAL NUMBER OF COMMANDS BUSIED FOR sNIC-y | | | | DECAP REWRITE RULE | FORWARD PACKET TO RQ ON Host-y |

FIG. 10

POLICY-DRIVEN STORAGE IN A MICROSERVER COMPUTING ENVIRONMENT

RELATED APPLICATIONS

The instant application is a continuation of, and claims priority to, U.S. patent application Ser. No. 15/869,256 filed on Jan. 12, 2018, entitled "POLICY-DRIVEN STORAGE IN A MICROSERVER COMPUTING ENVIRONMENT," which is a continuation of U.S. patent application Ser. No. 14/965,750 filed on Dec. 10, 2015, entitled "POLICY-DRIVEN STORAGE IN A MICROSERVER COMPUTING ENVIRONMENT," the contents of which are expressly incorporated herein by reference in their entireties.

TECHNICAL FIELD

This disclosure relates in general to the field of communications and, more particularly, to policy-driven storage in a microserver computing environment.

BACKGROUND

Microservers are an emerging trend of servers for processing lightweight, scale out workloads for hyper-scale data centers with large numbers of relatively lightweight server nodes. The microserver represents a new server architecture characterized by many (e.g., tens or even hundreds) lightweight server nodes bundled together in a shared chassis infrastructure, for example, sharing power, cooling fans, and input/output components, eliminating space and power consumption demands of duplicate infrastructure components. The microserver topology facilitates density, lower power per node, reduced costs, and increased operational efficiency. Microservers are generally based on small form-factor, system-on-a-chip (SoC) boards, which pack processing capability, memory, and system input/output onto a single integrated circuit.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 7 is a simplified block diagram illustrating yet other example details of embodiments of the communication system;

FIG. 8 is a simplified block diagram illustrating yet other example details of embodiments of the communication system;

FIG. 9 is a simplified block diagram illustrating yet other example details of embodiments of the communication system;

FIG. 10 is a simplified block diagram illustrating yet other example details of embodiments of the communication system;

DETAILED DESCRIPTION OF EXAMPLE EMBODIMENTS

Overview

An example method for facilitating policy-driven storage in a microserver computing environment is provided and includes receiving, at an input/output (I/O) adapter in a microserver chassis having a plurality of compute nodes and a shared storage resource, policy contexts prescribing (e.g., indicating, specifying, comprising, designating, etc.) storage access parameters of respective compute nodes and enforcing the respective policy contexts on I/O operations by the compute nodes, in which respect a particular I/O operation by any compute node is not executed if the respective policy context does not allow the particular I/O operation. The method further includes allocating (e.g., distributing, assigning, issuing, dispensing, etc.) tokens to command descriptors associated with I/O operations for accessing the shared storage resource, identifying a violation of any policy context of any compute node based on availability of the tokens, and throttling (e.g., regulating, decreasing, controlling, adjusting, choking, curbing, reducing, etc.) I/O operations by other compute nodes until the violation disappears.

As used herein, the term "policy context" of a compute node refers to a software object (e.g., structure) containing information (e.g., values of one or more relevant variables) related to one or more policies (e.g., conditions, rules, parameters, restrictions, constraints, etc.) to be applied on the compute node. As used herein, the term "compute node" refers to a hardware processing apparatus, in which user applications (e.g., software programs) are executed.

Example Embodiments

Figure 1A:
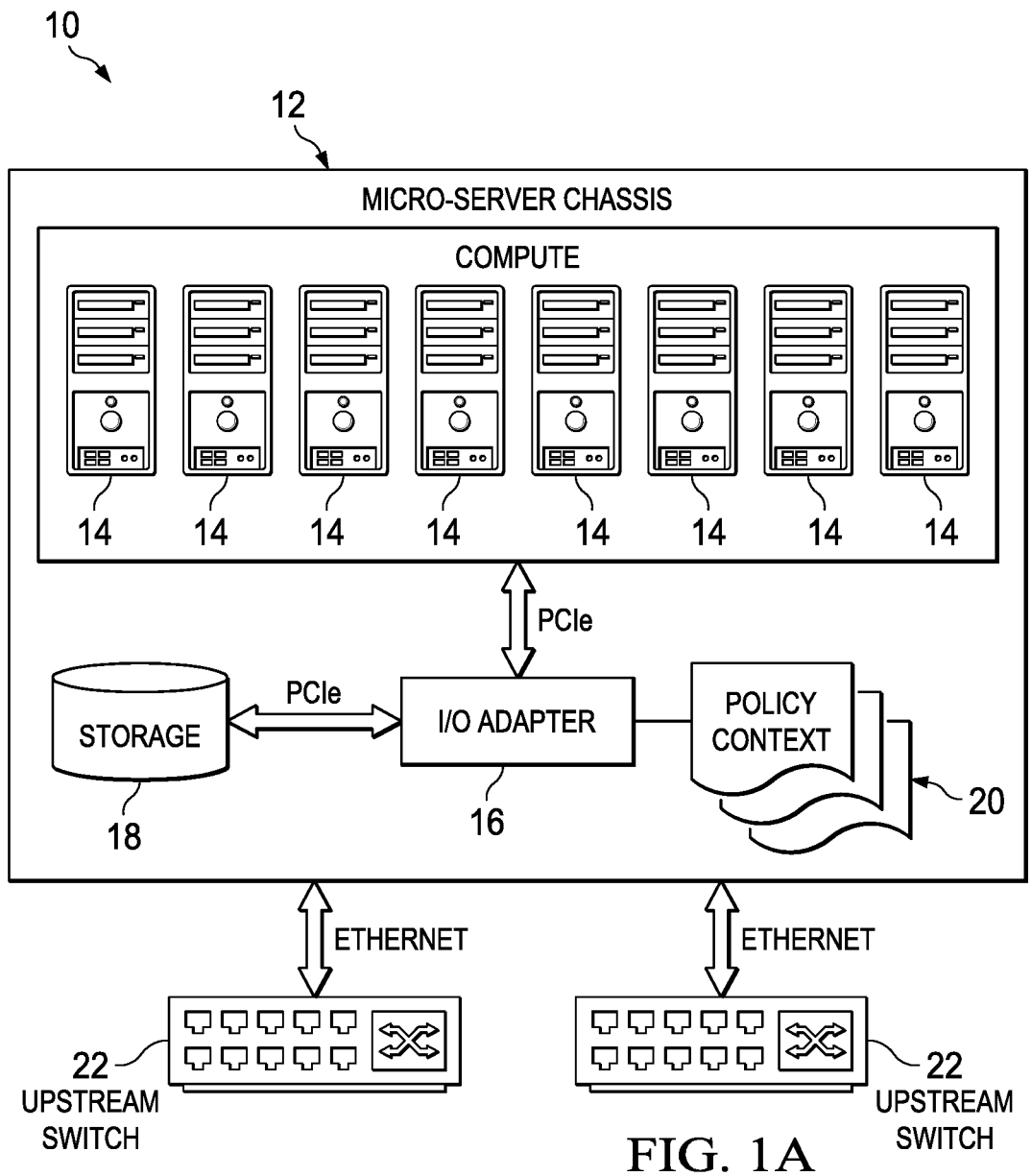
FIG. 1A is a simplified block diagram illustrating a communication system for policy-driven storage in a microserver computing environment.

Turning to FIG. 1, FIG. 1 is a simplified block diagram illustrating a communication system 10 for policy-driven storage in a microserver computing environment in accordance with one example embodiment. Communication system 10 includes a microserver chassis 12 comprising a plurality of compute nodes 14 sharing access to network and storage resources through a common input/output (I/O) adapter 16 (also called as Virtual Interface Card (VIC)). Note that the label "14" may refer to a single compute node, or it may refer to a plurality of compute nodes. Because the compute nodes are interchangeable in the sense that the description provided herein applies to all of them equally, irrespective of their particular computing, processing, and physical characteristics, using the label in the singular or plural is not intended to affect the meaning or scope of the embodiments.

I/O adapter 16 services (e.g., processes) both network and storage access requests from compute nodes 14 within microserver 12. In various embodiments, compute nodes 14 may access a shared storage resource 18 through I/O adapter 16 according to policy contexts 20 over a shared transmission medium, such as a Peripheral Component Interconnect Express (PCIe) bus. Each compute node 14 is associated with a corresponding policy context 20. Policy context 20 prescribe storage access parameters (e.g., input/output operations per second, minimum bandwidth, maximum bandwidth, etc.) of respective compute nodes 14.

Note that the label "20" may refer to a single policy context, or it may refer to a plurality of policy contexts without changing the scope of the embodiments. For example, policy context 20 may comprise a single software object comprising storage access parameters of substantially all compute nodes 14 in microserver chassis; in another example, policy context 20 may comprise a plurality of software objects, each such software object comprising storage access parameters of a corresponding one of compute nodes 14, and each such software object being referred to as a separate policy context. Irrespective of whether the label is used in the singular or plural, any policy context 20 comprises storage access parameters of one or more compute nodes 14 within the broad scope of the embodiments.

One or more switch(es) 22 outside microserver chassis 12 may provide network connectivity to a network external to microserver chassis 12. A management application, such as a Cisco® Unified Computing System™ (UCS) manager executing on (or through) switch 22 configures network endpoints (e.g., a network endpoint refers to a logical endpoint of network traffic corresponding to a specific network protocol layer) and storage endpoints (e.g., a storage endpoint refers to a logical endpoint for storage traffic) for each compute node 14 with user-defined attributes and capabilities. The UCS manager also provisions storage resource 18 (e.g., storage disks, memory space, boot space, logical unit numbers (LUNs), etc.) for each compute node 14 with suitable capacity and reliability characteristics (e.g., array of independent disks (RAID) level) according to user-provided instructions. An appropriate software executing on I/O adapter 16 creates suitable PCI endpoints on compute nodes 14, for example, associated with the respective network endpoints and storage endpoints. Respective host drivers managing the network endpoints and storage endpoints in corresponding compute nodes 14 plug into the appropriate network and storage stacks.

Some embodiments of communication system 10 facilitate network centric data center management with the network endpoints and storage endpoints being capable of being configured through centralized policy enforcement according to user-defined attributes and capabilities. Whereas the network endpoints have a peer representation on upstream switch 22 where policies can be enforced, storage resource 18 is local to microserver 12 and the storage endpoints exist solely in the domain within microserver chassis 12. In other words, the storage endpoints are inaccessible to switch 22 (e.g., storage traffic is local to microserver chassis 12 and does not traverse switch 22), and thus policy contexts 20 cannot be enforced at switch 22.

Compute nodes 14 may be of varying processing capacities and PCIe bandwidths. For example, in some embodiments, compute nodes 14 may comprise application specific servers, wherein the respective central processing units (CPUs) and storage resource 18 are custom-built for the applications executing thereon, with one of compute nodes 14 using a 2 GHz CPU and 512 MB of memory, another of compute nodes 14 using a 1 GHz CPU and 256 MB of memory, and so on. In another example, some workloads may require guaranteed bandwidth; some other workloads may require bandwidth to be restricted according to pre-defined parameters (e.g., network utilization, storage throughput, I/Os per second (IOPS), storage bandwidth utilization); etc. According to various embodiments, a datacenter administrator can configure compute nodes 14 for various different workloads having different network and storage bandwidths through the UCS manager executing on switch 22. At least a portion of the configuration pertaining to accessing storage resource 18 may be stored locally in microserver chassis 12 as policy contexts 20 and enforced by I/O adapter 16.

In various embodiments, I/O adapter 16 may also facilitate collection of statistics on host network adapters and export them to UCS manager. The administrator can view per network interface statistics on a suitable graphical user interface (GUI) of UCS manager. In various embodiments, configuration of the various network endpoints and storage endpoints may be enforced through appropriate policies, which can change dynamically as desired by the administrator. VIC protocol control messages may be exchanged between microserver chassis 12 and switch 22 to apply the policies immediately (e.g., contemporaneously, simultaneously, within a predetermined time period, etc.). Thus, UCS manager provides a unified view of the data center and makes it easy for the administrator to administer any configuration change from a single control point.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Turning to memory retrieval operations, direct memory access (DMA) is an ability of a device (such as a compute node) to access local host memory directly, without the intervention of any central processing units (CPUs). Remote DMA (RDMA) is the ability of accessing (e.g., reading from or writing to) memory on a remote machine without interrupting the processing of the CPU(s) on the remote machine. Although compute nodes 14 are local within microserver chassis 12, they are remote relative to each other's compute and memory resources, and therefore RDMA can be used for data transfers between compute nodes 14 with minimal processor overhead and low latency.

RDMA communication is based on a set of three queues: (i) a send queue and (ii) a receive queue, comprising a Queue Pair (QP) and (iii) a Completion Queue (CQ). Posts in the QP are used to initiate the sending or receiving of data. An application (e.g., through a host driver) places instructions on its work queues that generate buffers in I/O adapter 16 to send or receive data. I/O adapter 16 consumes the instructions from the send queue at the egress side and streams the data to its memory region corresponding to the remote system. The memory region consumes the work queues at the receive queue at the ingress side and places the received data in appropriate memory regions of the host.

In a general sense, the RDMA traffic between compute nodes 14 in microserver chassis 12 does not leave the PCIe domain (e.g., shared transmission medium within microserver chassis 12 through which data is communicated according to PCIe protocols) and enter the Ethernet domain (e.g., Ethernet network outside microserver chassis 12 through which data is communicated according to Ethernet protocols). In other words, the RDMA traffic is local to microserver chassis 12 and does not traverse switch 22. On the other hand, network traffic from and to compute nodes 14 traverse switch 22. Therefore, unlike enforcement of network traffic related policies (of administrator provided instructions at UCS manager), enforcement of storage traffic related policies cannot be performed at switch 22.

Moreover, in such shared infrastructure deployments, in which shared storage resource 18 is fixed and limited in size, there is a potential for one compute node 14 to starve other compute nodes 14 by over utilizing shared storage resource 18. Thus, applications running on compute nodes 14 experience uneven storage performance despite corresponding compute nodes 14 having identical processing power and PCIe bandwidth.

In addition, because the storage interfaces of compute nodes 14 directly communicate with shared storage resource 18 through I/O adapter 16, bypassing switch 22, the I/O statistics are not accessible to the central UCS manager executing in switch 22. The administrator has to rely on statistics collected by storage stacks on each disparate compute node 14 for the I/O statistics. Any sort of storage traffic shaping has to be executed on respective compute nodes 14 and cannot be dynamically changed without manual intervention. In large data centers with hundreds and thousands of compute nodes 14 on separate microserver chassis, such manual adjustment of policies for each of compute nodes 14 may not be practical.

Further, because each compute node 14 has access only to its local storage traffic, any global analysis of the I/O statistics (e.g., such as shared load on the shared resources) cannot be facilitated by per-compute node policies enforced separately on each compute node 14. The operating system of each compute node 14 does not have a global view of storage traffic originating from all compute nodes to a shared storage infrastructure. Thus, while the operating system can offer ways to limit the bandwidth for the corresponding compute node 14, it cannot enforce policies guaranteeing a minimum bandwidth or throughput. Such a highly rigid manual approach can defeat centralized management of the data center.

As compute nodes 14 don different roles in the clustered multi-host environment, they run different applications and workloads, with corresponding differing requirements for network and storage bandwidth. Some applications also mandate certain minimum network and storage bandwidth at any given time for optimal performance. Whereas network QoS management has been well established and implemented across various network elements (e.g., OS stack, network adapter, switches, routers, etc.) in the network, technologies and solutions to manage storage QoS have been lagging. Storage area network (SAN) storage vendors have attempted to implement storage QoS on SAN switches and targets. However, the SAN solutions are not applicable for the microserver computing environment, in which every compute node 14 perceives storage as local, but share a common storage controller to access boot and data LUNs.

To provide storage QoS in such multi-host system, there is a need for sampling storage I/O commands across compute nodes 14 and arbitrating access to shared storage resource 18 based on administrator provided configuration. Moreover, there is a further need for the solution to be policy based, dynamic and centralized, working uniformly across all host platforms and operating systems, without separate agents executing on compute nodes 14 to shape storage traffic.

Communication system 10 is configured to such issues (among others) by facilitating policy-driven storage in a microserver computing environment. According to various embodiments, a human administrator defines QoS policies at switch 22 for storage adapters associated with compute nodes 14. The QoS policies define various parameters, such as maximum bandwidth allocated to a particular compute node 14, maximum number of IOPs allowed from a particular storage adapter, and/or minimum bandwidth to be guaranteed for a particular storage adapter. The policies are dynamic, in the sense that they can be changed at any time, irrespective of the state of compute node 14. Any changes in storage QoS policies are communicated substantially immediately to I/O adapter 16 through suitable VIC protocol control messages. The QoS policies are stored locally at I/O adapter 16 as policy context 20.

Figure 1B:
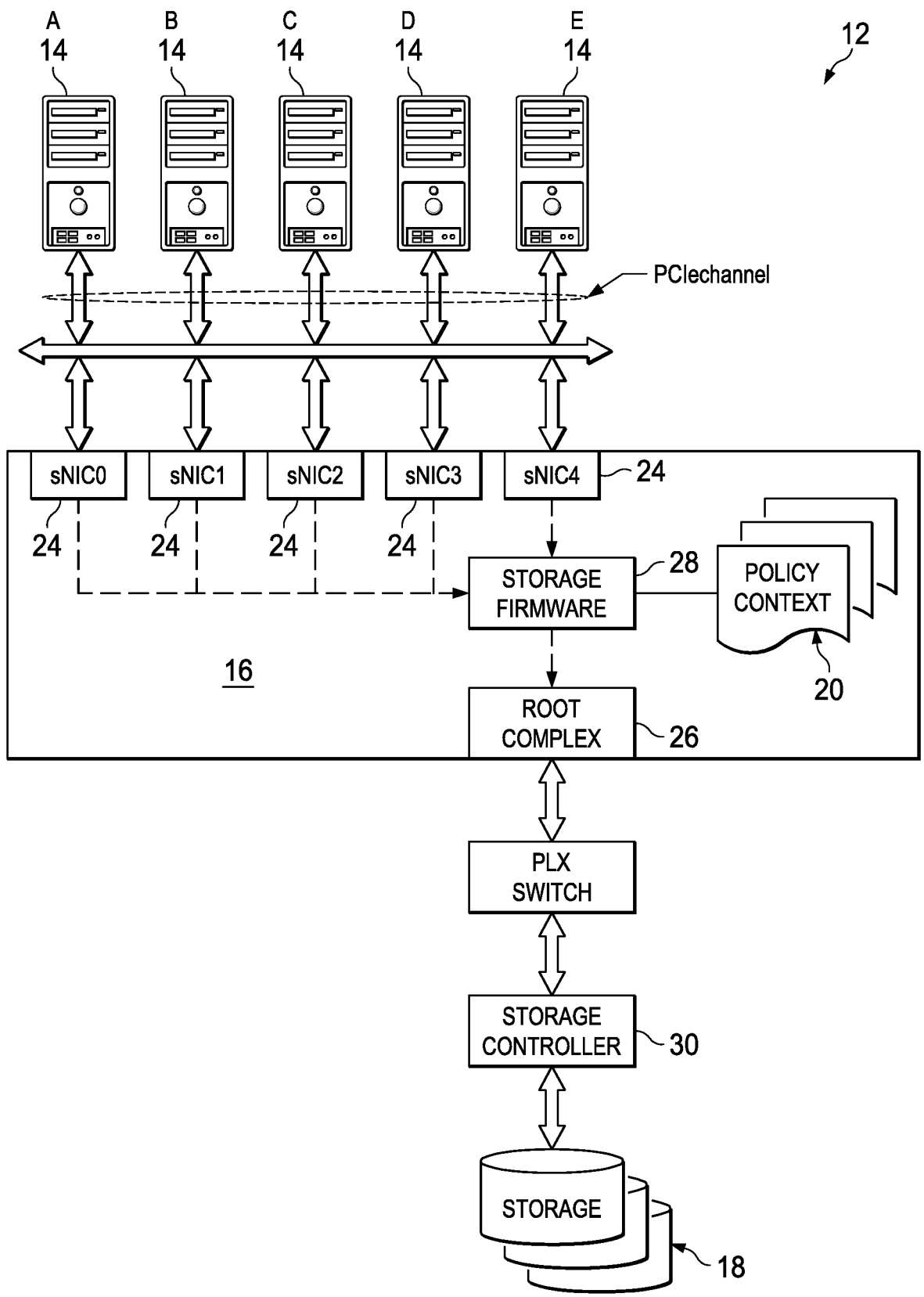
FIG. 1B is a simplified block diagram illustrating example details of an embodiment of the communication system.

Turning to FIG. 1B, FIG. 1B is a simplified diagram illustrating various components facilitating operations of communication system 10 within microserver chassis 12. Compute nodes 14 are referred in the figure as "A", "B", "C" and so on. Each compute node 14 is associated with a separate Small Computer System Interface (SCSI) network interface card (sNIC) 24. sNICs 24 are referred in the figure as "sNIC0", "sNIC1", "sNIC2" and so on. Note that the label "24" may refer to a single sNIC, or it may refer to a plurality of sNICs without affecting the meaning or scope of the embodiments. In various embodiments, each sNIC 24 may comprise a portion of an Application Specific Integrated Circuit (ASIC) with a unique PCIe physical function, such as enabling connectivity of associated compute node 14 to a portion of shared storage resource 18.

A System Link Technology™ executing in communication system 10 enables creation of PCIe physical functions represented by sNICs 24. Any one sNIC 24 presents a PCIe storage endpoint comprising a virtual storage controller to the operating system of the respective compute node 14 and maps storage resource 18 to a specific service profile within the UCS manager (e.g., executing in or through upstream switch 22). For example, sNIC0 presents a virtual storage controller to the operating system of compute node A and maps storage resource 18 to a specific service profile within the UCS manager associated with compute node A. Similarly, sNIC1 presents a virtual storage controller to the operating system of compute node B and maps storage resource 18 to a specific service profile within the UCS manager associated with compute node B; and so on.

I/O adapter 16 creates sNICs 24 based on administrator provided policies at switch 22. sNICs 24 allow respective ones of compute nodes 14 to have their own specific virtual drive carved out of the available physical drives within microserver chassis 12. The communication between the operating system to the drive is via standard SCSI commands. sNICs 24 comprise PCIe endpoints claimed by SCSI host drivers of respective compute nodes 14. The UCS manager at switch 22 provisions storage on shared storage resource 18 and exports LUNs to compute nodes 14 via respective sNICs 24.

A root complex 26 of the PCIe bus of microserver chassis 12 enables connectivity to a PLX switch (optional) and a storage controller 30, which connects to various shared storage devices (SSD) comprising storage resource 18. In various embodiments, shared storage controller 30 comprises any off-the-shelf storage controller from any suitable vendor. The PLX switch is optional, and may be used to extend the number of shared storage controllers that can be attached to the PCIe bus. Storage firmware 28 executing in I/O adapter 16 maintains per sNIC policy contexts, indicative of active policies for corresponding compute nodes 14 as specified in policy context 20. In some embodiments, the centralized UCS manager provisions LUNs for compute nodes 14 using out of band management interface over an Inter-Integrated Circuit (I2C) bus. I/O adapter 16 samples the I/O traffic originating from sNICs 24 to various LUNs on storage resource 18 and generates (and maintains) counters per sNIC interface or optionally per sNIC and per LUN (e.g., <sNIC, LUN>).

According to various embodiments, shared storage controller 30 exposes a command ring comprised of an array of command descriptors (of SCSI commands) to storage firmware 28. Each command descriptor contains SCSI command related information, address pointers to data buffers in shared storage resource 18 and a variety of control information. The command ring comprises a circular buffer comprising the command descriptors. Embodiments of communication system 10 allocate tokens to command descriptors associated with I/O operations for accessing shared storage resource 18 (e.g., tokens represent command descriptors). In an example embodiment, storage firmware 20 allocates the token to the command descriptors.

For example, each command descriptor in the command ring is represented as a token associated with the corresponding I/O operation (e.g., SCSI command). As used herein, "token" is a special series of bits that travels around a token-ring buffer, such as the command ring. As the token circulates, packet processors in I/O adapter 16 can capture it. The token acts like a ticket, enabling its owner (e.g., marked SCSI command) to be executed. In some embodiments, only one token is associated with each I/O operation that accesses a specific portion of shared storage resource 18. The tokens are managed in a common resource pool and an arbiter routine (e.g., software code, microcode, computer program, process, thread, instructions, etc.) of storage firmware 28 assigns the tokens to corresponding I/O commands.

Any suitable token management protocol may be used within the broad scope of the embodiments. For example, the tokens are distributed by the token ring: each cycle a packet processor's thread interface unit (TIU) passes on a token to the right and receives one from the left. Two basic instructions are provided for ring management: the first instruction requests a token; the processor removes a token from the ring, if one is available, and places it in the requesting thread's context. The requesting thread is then allowed to fork and jump, much like a subroutine call. When the thread terminates, the second instruction releases the token back into the ring. In a general sense, only SCSI command holding the token (e.g., marked with the token) can access the shared storage resource 18. In some embodiments, the token specifies an index to be used in the command ring of shared storage controller 30.

For every I/O command, the arbiter routine decides to award or deny the token for that I/O command based on token availability in the command ring and policy context 20 for corresponding sNIC 24. If the arbiter routine awards the token, a data processor in I/O adapter 16 initiates a command request by posting the I/O command in the command queue of shared storage controller 30. In various embodiments, the data processor executes storage firmware 28. If arbiter routine denies the token due to unavailability or based on policy context 20, the data processor returns a "BUSY" status for that I/O command.

Shared storage controller 30 notifies the data processor of completion of the I/O command. The data processor forms a I/O completion notification and forwards it to relevant compute node 14 that initially issued the SCSI command. The arbiter routine monitors the I/O completion notifications and returns the token back to the common token pool. Each sNIC 24 provides a pair of (i) command queue and (ii) response queue for issuing I/O commands to shared storage controller 30 and also for receiving I/O completion notifications. Moreover, I/O adapter 16 gathers storage I/O statistics and token arbitration without impacting data path performance. In some embodiments, the administrator can change the storage QoS policy even when compute nodes 14 are operational and I/Os are active. Policy changes are communicated to storage firmware 28 via VIC protocol control messages and are validated before being enforced.

Turning to the infrastructure of communication system, network topology of the network including microserver chassis 12 can include any number of compute nodes, servers, hardware accelerators, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, microserver chassis 12 may comprise a rack-mounted enclosure, blade enclosure, or a rack computer that accepts plug-in compute nodes 14. Note that microserver chassis 12 can include, in a general sense, any suitable network element, which encompasses computers, network appliances, servers, routers, switches, gateways, bridges, load-balancers, firewalls, processors, modules, or any other suitable device, component, element, or object operable to exchange information in a network environment. Moreover, the network elements may include any suitably configured hardware provisioned with suitable software, components, modules, interfaces, or objects that facilitate the operations thereof. This may be inclusive of appropriate algorithms and communication protocols that allow for the effective exchange of data or information.

Compute nodes 14 may comprise printed circuit boards, for example, manufactured with empty sockets. Each printed circuit board may hold more than one processor (e.g., within the same processor family, differing core counts, with a wide range of frequencies and vastly differing memory cache structures may be included in a single processor/socket combination). In some embodiments, each compute node 14 may comprise one or mode central processing unit (CPU) and memory with standard PCIe connectivity to chassis resources, including storage resource 18. Components shared in microserver chassis 12 includes power, management, cooling, storage and networking.

I/O adapter 16 may include an electronic circuit, expansion card or plug-in module that accepts input and generates output in a particular format. I/O adapter 16 facilitates conversion of data format and electronic timing between input/output streams and internal computer circuits of microserver chassis 12. In an example embodiment, I/O adapter 16 comprises five Microprocessor without Interlocked Pipeline Stages (MIPS) processors, with one of them executing control firmware and the remaining handling the storage data path.

Embodiments of communication system 10 facilitate achieving both minimum bandwidth utilization and maximum bandwidth utilization of shared storage resource 18 by compute nodes 14 within microserver chassis 12. Further, various policy enforcement operations described herein are performed on sNICs 24 without manual intervention or any intervention by compute nodes 14. In other words, the policy enforcement is transparent to compute nodes 14.

Whereas communication system 10 has been described with reference to a microserver computing environment, it will be appreciated that the operations described herein can be executed at any network level wherein a plurality of computing devices access shared storage resources. For example, the operations performed by I/O adapter 16 may be extended to execute at switch 22. Thus, the operations described herein may be applied to a storage area network (SAN) environment with servers in physically distinct chassis sharing storage resources in the SAN. Policy enforcement using tokens, and per-sNIC policy contexts, etc. as described herein may be performed at switch 22 connecting the servers in such scenarios.

The number of applications running in a typical data center is growing exponentially. With this, the demand for servers and network infrastructure is also constantly growing. Massively Scalable Data Centers are being hosted by various cloud providers. The microserver architecture allows use of more compute nodes using less physical space. For efficient management of such microserver infrastructure, it is desirable to consolidate management planes at single point of control, as is possible with embodiments of communication system 10. Also, different treatment of storage traffic based on the workload and application performance is possible through enforcement of appropriate policy contexts 20. Embodiments of communication system 10 allow defining a storage QoS policy from centralized management software in switch 22 and dynamically updating the QoS based on demand and requirements.

Figure 2:
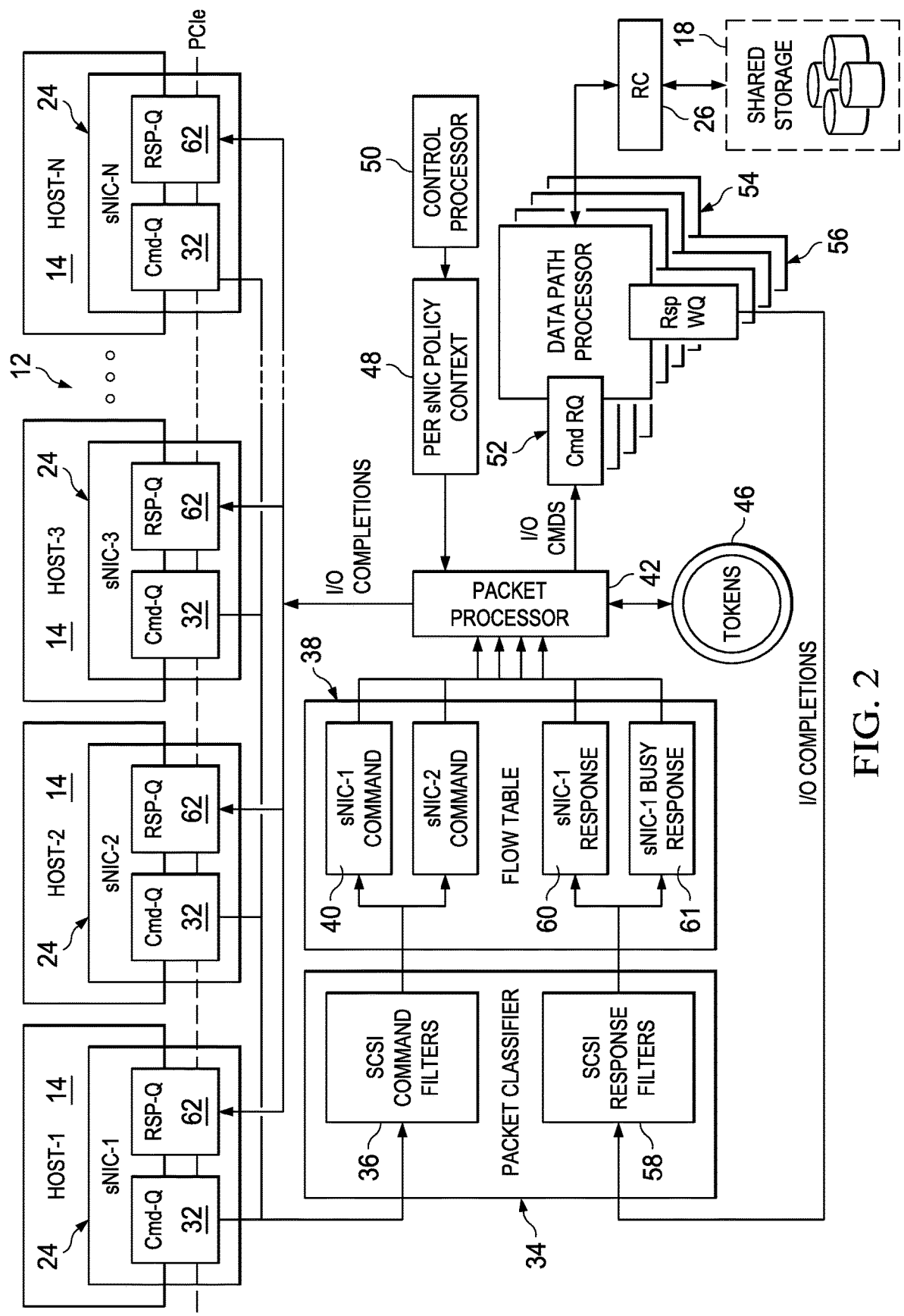
FIG. 2 is a simplified block diagram illustrating other example details of embodiments of the communication system.

Turning to FIG. 2, FIG. 2 is a simplified block diagram illustrating example details of microserver chassis 12 according to an embodiment of communication system 10. Embodiments of communication system 10 facilitate improvement of existing VIC protocol to communicate per compute node storage QoS policies using various functional blocks to sample per compute node or per sNIC I/O statistics without adding latency. Compute nodes 14 are referred in the figure as Host-1 through Host-N. For simplicity's sake, example details associated with a single compute node, namely Host-1 are described further. Note that the description is equally applicable to all of compute nodes 14.

Host-1 is associated with a particular sNIC 24, namely, sNIC-1, provisioned with a command queue 32, to which a host driver of an application executing in Host-1 posts a I/O operation (e.g., SCSI command), such as a read command, or a write command as a SCSI packet through sNIC-1. Command queue 32 may be provisioned in sNIC-1 associated with Host-1 by a control firmware, which forms a portion of storage firmware 28. sNIC-1 may encapsulate the SCSI packet in an Ethernet packet with an appropriate Ethernet header. A packet classifier 34 in I/O adapter 16 filters the Ethernet packet using appropriate SCSI command filters 36. In some embodiments, packet classifier 34 filters the Ethernet packet based on its Layer 2 (L2) to Layer 5 (L5) header fields.

The filtered result comprises a key which can be used to index into a flow table 38, which includes a plurality of entries associated with SCSI commands corresponding to sNICs 24, among other parameters. In the example shown, flow table entry 40 is associated with a SCSI command corresponding to sNIC-1. Flow table 38 facilitates recording storage traffic in microserver chassis 12 based on suitable match criteria for further analysis. In a general sense, flow table 38 may be used to track packet flows based on suitable match criteria applied to header fields in the Ethernet packets' L2-L5 headers. In some embodiments, flow table 38 provides a secondary look up table after packets are filtered at packet classifier 34. In some embodiments, any match in flow table 38 updates associated statistics in hardware (e.g., ASIC) in I/O adapter 16. The statistics include packet count, byte count and latest timestamp. In some embodiments, each flow table entry is also associated with an action field, such as forwarding the packet to a suitable queue, or executing an appropriate microcode routine.

Note that packet classifier 34 and flow table 38 classify and track Ethernet packets. In a general sense, packet classifier 34 and flow table 38 are generally available in any I/O adapter and are configured typically for Ethernet packet processing. Such general purpose packet classifier 34 and flow table 38 can be modified according to embodiments of communication system 10 to include appropriate filters to filter (e.g., identify, screen, etc.) SCSI commands and responses (e.g., containing CDB and LUN information) formatted as Ethernet packets with a reserved internal Ether type.

In various embodiments, the flow table lookup of the filtered result from packet classifier 34 triggers execution of an arbiter routine (or other such action) in a packet processor 42. In an example embodiment, packet processor 42 processes packets on ingress or egress paths per Uplink Inter-Face (UIF) of I/O adapter 16. In some embodiments, the arbiter routine comprises various special microcode routines (also known as Rewrite Rules). which are executed in packet processor 42 to modify contents of the packets and to further perform other actions.

The arbiter routine, which can comprise a microcode routine in some embodiments, decides to award or deny a token to the SCSI command from sNIC-1 based on token availability in a common token pool 46 and according to a per sNIC policy context 48. Common token pool 46 contains tokens allowing I/O commands to be executed or returned back to the host with a BUSY/QUEUE FULL status. In various embodiments, common token pool 46 is derived from the command ring provided by shared storage controller 30. The command descriptors of the command ring are managed as resources and allocated from common token pool 46.

According to an example embodiment, common token pool 46 comprises a circular buffer marked by a producer and consumer index. The arbiter routine awards tokens to the SCSI commands from the circular buffer. The arbiter routine also returns tokens back to common token pool 46 after I/O command completion. In various embodiments, a single packet processor 42 manages the award and return of tokens from and to common token pool 46.

In various embodiments, per sNIC policy context 48 is derived by a control processor 50 from policy context 20 in some embodiments. Per sNIC policy context 48 holds per sNIC storage access parameters of sNICs 24 configured according to policy context 20 received from switch 22 at I/O adapter 16. In an example embodiment, the per sNIC storage access parameters comprise maximum bandwidth, minimum bandwidth or maximum IOPS associated with storage traffic. In various embodiments, control processor 50 comprises a MIPS based processor executing control path firmware. The control path firmware executing in control processor 50 configures sNICs 24 and shared storage resource 18 mapped to compute nodes 14, handles VIC protocol communication between I/O adapter 16 and the UCS manager executing on switch 22, and handles requests from host drivers to change states of sNICs 24.

In one example, the administrator specifies values of various storage access parameters for each compute node 14 in policy context 20; control processor 50 retrieves the association of each compute node 14 with its corresponding sNIC 24 (e.g., Host-1 is associated with sNIC-1); control processor 50 applies the various storage parameters specified in policy context 20 with corresponding sNIC 24 based on the retrieved association. In another example, the administrator specifies values of various storage access parameters for groups of compute nodes 14 (e.g., compute nodes 14 executing web applications can use a maximum of x amount of bandwidth; compute nodes 14 executing database applications must have a minimum of y amount of bandwidth; etc.) in policy context 20. Control processor 50 identifies compute nodes 14 in the respective groups, retrieves association of each identified compute node 14 with its corresponding sNIC 24, and applies the various storage parameters specified in policy context 20 with corresponding sNIC 24 based on the retrieved association. Note that the groups of compute nodes 14 can be based on any suitable criterion, such as applications, users, authentication parameters, user roles, compute node hardware, etc. within the broad scope of the embodiments.

Turning back to operations on the Ethernet packet from sNIC-1, the arbiter routine executing in packet processor 42 strips the Ethernet header off the Ethernet packet (using any suitable stripping procedure known in the art) and posts the SCSI command into a command response queue (RQ) 52 at a data path processor 54. In various embodiments, data path processor 54 comprises a MIPs based processor in I/O adapter 16. If the token has been awarded, the I/O command is forwarded to shared storage controller 30 through root complex 26. Root complex 26 provides connectivity to storage controller 30 over a PCIe interface. The DMA operation associated with the I/O command is carried out directly between storage controller 30 and Host-1 over a PCIe bus.

Resources (e.g., command ring) of storage controller 30 are directly mapped to a VIC address space (e.g., memory space) in I/O adapter 16; control path and data path firmware running on various MIPS processors (e.g., data path processor 54) in I/O adapter 16 can access the memory mapped space to issue the I/O commands. Storage controller 30 can perform DMA to or from server address spaces (in memory) using suitably specialized hardware (e.g., ternary content addressable memory (TCAM) table).

Data path processor 54 is notified when the I/O operation is complete. For example, I/O completion interrupts are mapped to data path processor 54, which thereafter generates a completion event to be sent to Host-1. Data path processor 54 creates a I/O completion notification indicating completion of the SCSI command from sNIC-1 and posts the I/O completion notification in a response work queue (WQ) 56. The I/O completion notification is encapsulated in an appropriate Ethernet packet having a suitable Ethernet header according to embodiments described herein.

Packet classifier 34 filters the Ethernet header according to SCSI response filters 58. The result of the filtering comprises a key that is used as an index into flow table 38. The Ethernet response packets are matched with appropriate response entries 60 corresponding to sNIC-1 associated with the I/O completion notification. Had the I/O completion notification been an indication of "BUSY" or "QUEUE FULL" status, another appropriate busy response entry 61 corresponding to sNIC-1 provides the requisite match. Any match in flow table 38 triggers execution of an appropriate arbiter routine in packet processor 42. The arbiter routine returns the token associated with the I/O command to common token pool 46 and posts the I/O completion notification in a response queue 62 of Host-1.

In various embodiments, the arbiter routine indicated in flow table 38 varies according a type of the SCSI packet. If the SCSI packet encapsulated in the Ethernet packet comprises a SCSI command, the arbiter routine determines if policy context 20 permits a token fetch; if the policy context permits the token fetch, the arbiter routine attempts to fetch one of the tokens from common token pool 46. On the other hand, if the SCSI packet encapsulated in the Ethernet packet comprises a SCSI response, the arbiter routine increments a hit counter in flow table 38 indicative of a number of I/O operations completed for sNIC-1 of Host-1, decapsulates the Ethernet packet and forwards the SCSI response to sNIC-1. Further, if the SCSI packet encapsulated in the Ethernet packet comprises a SCSI busy response indicating token unavailability, the arbiter routine decapsulates the Ethernet packet and forwards the SCSI busy response to sNIC-1.

Figure 3:
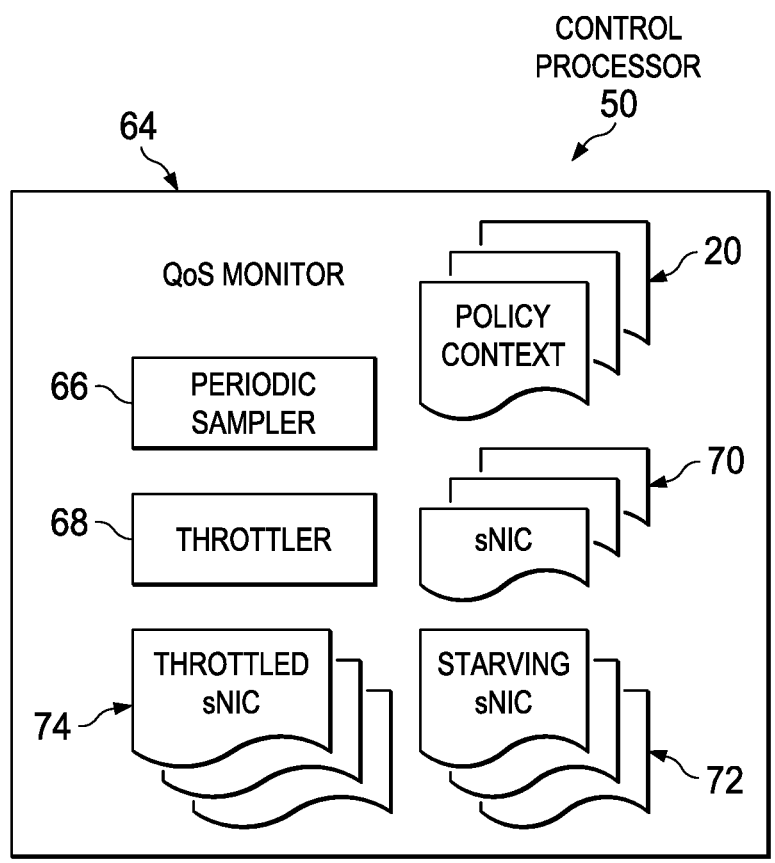
FIG. 3 is a simplified block diagram illustrating yet other example details of embodiments of the communication system.

Turning to FIG. 3, FIG. 3 is a simplified diagram illustrating example details of control processor 50 according to an embodiment of communication system 10. In a general sense, control path firmware initializes various flow table entries (e.g., 40, 60, 61) in flow table 38 and filters (e.g., 36, 58) in packet classifier 34 based on the QoS policies defined for associated sNIC 24 in policy context 20. The control path firmware calculates the maximum and minimum threshold tokens and maximum IOPS during implementation of I/O commands.

The control path firmware initializes a QoS monitor 64, which runs periodically on control processor 50. QoS Monitor 64 administers system-wide QoS policies across sNICs 24 and/or compute nodes 14. QoS Monitor 64 has a global view of the total load on shared storage resource 18, including visibility to current bandwidth utilization of various sNICs 24 and policy context 20. As an example, a monitor thread (e.g., sequence of instructions) of QoS monitor 64 can make decisions to provide guaranteed bandwidth for sNICs 24, which request such guaranteed bandwidth. QoS monitor 64 includes two monitor threads: a low frequency (e.g., once a second) periodic sampler 66 and a higher frequency throttler 68. QoS monitor 64 also maintains a sNIC list 70, comprising a list of sNICs 24 in microserver chassis 12.

Periodic sampler 66 samples the I/O operations being executed and updates the per sNIC IOPS parameter in flow table 38. Throttler 68 is scheduled to run at a higher frequency if low frequency periodic sampler 66 detects violations of policy context 20. High frequency throttler 68 attempts to correct the violations by dynamically throttling and un-throttling sNICs 24.

During operation, periodic sampler 66 samples flow table entries (e.g., 40, 60, 61) for sNICs 24 in flow table 38. Periodic sampler 66 measures IOPS based on the number of I/O completions sampled in successive runs. For sNICs 24 that have requested bandwidth reservation according to associated policy context 20, a "starve counter" is examined in the corresponding flow table entry. If the starve counter is 0, nothing is done. On the other hand, a non-zero starve counter, and/or a number of outstanding token count lower than a minimum threshold token indicates starvation (e.g., unavailability of requested bandwidth reservation). The sNIC is considered as a "starving sNIC" and added to a starving sNIC list 72. In an example embodiment, periodic sampler 66 identifies substantially all starving sNICs in a single sweep (e.g., execution) and schedules throttler 68 to handle the situation.

In various embodiments, high frequency throttler 68 is invoked on demand, and it executes at a higher frequency (than periodic sampler 66) until the starving situation is remedied and the violation of policy context 20 disappears. In an example embodiment when it is invoked, throttler 68 is scheduled to execute every 100 ms until starving sNICs 24 are no longer starved. In various embodiments, throttler 68 make a list of sNICs 24 that can be throttled and lists such sNICs in a throttled sNIC list 74. sNICs 24 may be listed in throttled sNIC list 74 based on several criteria: for example, sNICs 24 without any associated policy context may be added to throttled sNIC list 74; sNICs 24 that have relatively lower priority according to policy context 20 may be added to throttled sNIC list 74 (e.g., low priority sNICs are added before normal priority sNICs); sNICs having a "Max TOPS" (0x01) policy type or "Max Bandwidth utilization" (0x02) policy type may be added to throttled sNIC list 74; sNICs having lower bandwidth requirement and not experiencing any violation of respective per sNIC policy context 48 may be added to throttled sNIC list 74; and so on. The operating state of such sNICs added to throttled sNIC list 74 may be set to "PAUSED".

In an example embodiment, the state of starved sNICs may be checked after a predetermined wait period (e.g., 100 ms). If the situation has not improved (e.g., number of starved sNICs remains the same; or the same set of sNICs continue to be starved; etc.), additional sNICs may be added to throttled sNIC list 74. The operations may continue until previously starved sNICs 24 are able to perform I/O operations at a desired (e.g., guaranteed) bandwidth utilization. Thereupon, high frequency throttler 68 ceases to reschedule itself and terminates its operation. In some embodiments, before terminating, high frequency throttler 68 also updates QoS monitor 64 to indicate completion of the throttling task.

In various embodiments, periodic sampler 66 detects during execution that certain sNICs 24 are being throttled; thereupon, periodic sampler 66 monitors the condition of such sNICs 24 that have minimum (e.g., guaranteed, required, etc.) bandwidth requirement. If all sNICs 24 are able to perform I/O operations at the minimum (e.g., guaranteed, required, etc.) bandwidth utilization, periodic sampler 66 starts unblocking sNICs 24 by traversing the throttled sNIC list 74 in the reverse order. In some embodiments, low frequency periodic sampler 66 unblocks only a subset of throttled sNICs to avoid overload on communication system 10. Periodic sampler 66 also monitors the current starvation situation and stops the unblock operation if it detects that some (or at least one) sNICs 24 are starved. Embodiments of communication system 10 can facilitate achieving both minimum and maximum bandwidth utilization of shared storage resource 18 without any intervention from compute nodes 14 or the administrator.

Figure 4:
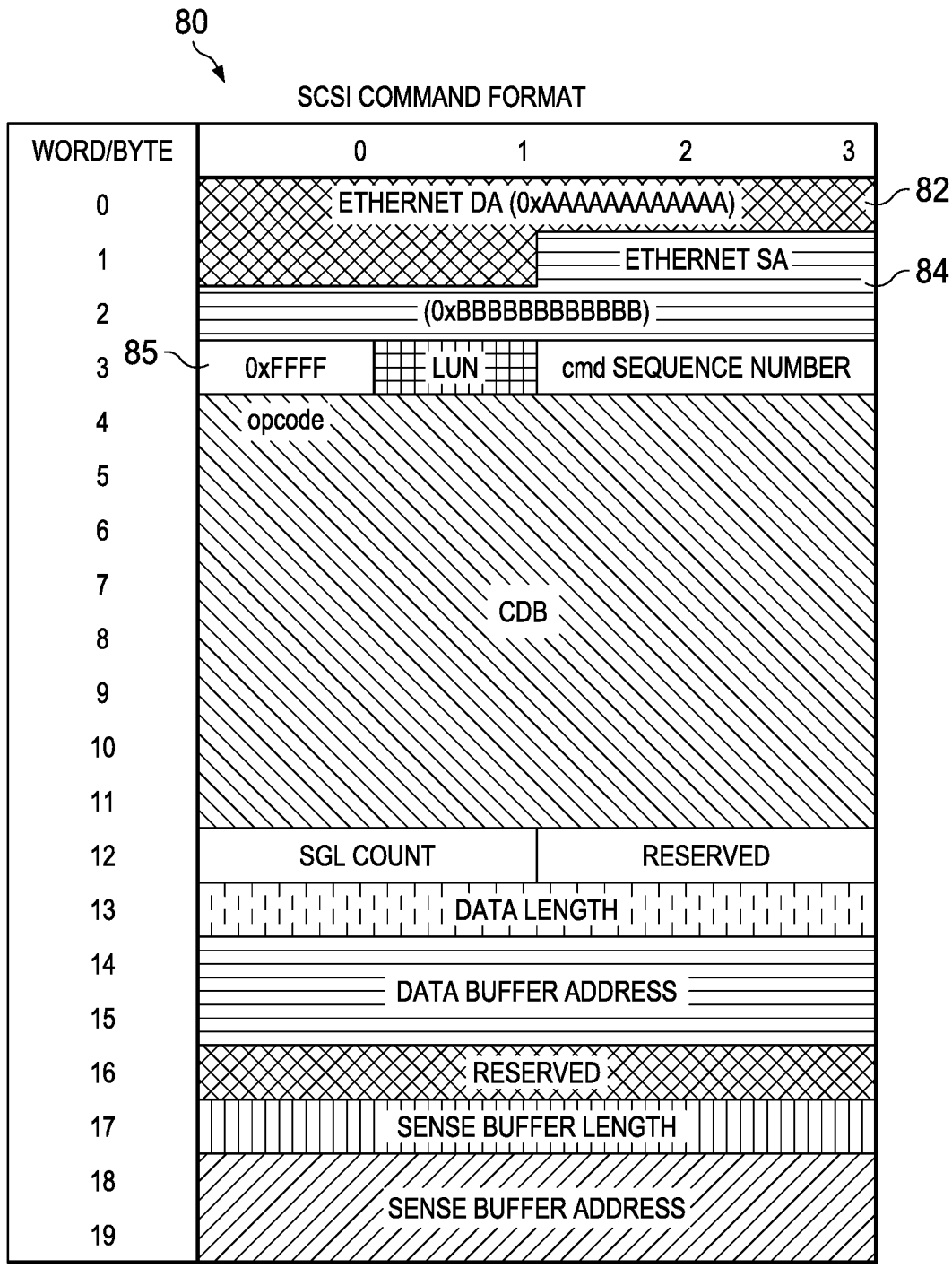
FIG. 4 is a simplified block diagram illustrating yet other example details of embodiments of the communication system.

Turning to FIG. 4, FIG. 4 is a simplified diagram illustrating example details of an Ethernet command packet 80 comprising a SCSI command according to an embodiment of communication system 10. The platform dependent host driver registers with a SCSI mid layer to receive SCSI I/O commands. The host driver discovers LUNs configured in storage resource 18 during initialization and presents them to the SCSI mid layer. The mid layer sends an I/O command to storage resource 18 by passing a SCSI Command Descriptor Block (CDB) and associated buffers for receiving data and status. The host driver encapsulates the SCSI command in the format shown in the FIGURE.

The SCSI CDB and other command parameters are encapsulated in Ethernet command packet 80. Ethernet command packet 80 uses a fake preset destination Media Access Control (MAC) address 82, source MAC address 84, and Ethertype 85 to indicate its status as a SCSI command. In an example, source and destination MAC addresses 84 and 82 respectively, comprise unique MAC addresses (e.g., 0xBBBBBBBBBBBB and 0xAAAAAAAAAAAA, respectively); Ethertype 85 comprises a value of 0xFFFF. Values of source MAC address 84 and destination MAC address 82 and Ethertype 85 are programmed in packet classifier 34 to trap Ethernet command packet 80. For example, a value of 0xBBBBBBBBBBBB in source MAC address 84 and a value of 0xAAAAAAAAAAAA in destination MAC address 82 indicate that Ethernet command packet 80 encapsulates a SCSI command.

Ethernet command packet 80 can also include various other fields and corresponding values. For example, an opcode field is one byte long and indicates if the command is READ/WRITE or any other control command according to SCSI specifications. A CDB field can be 6, 10, 12 and 16 bytes based on the size of data transfer or logical block addressing (LBA) being accessed. The CDB field is followed by a data buffer consisting of write data or space where READ data is copied. Ethernet command packet 80 also carries information about a sense buffer to handle termination of the command with a check condition. A reserved field of 4 bytes, which is not updated by the host driver may also be provided to be used by the arbiter routine to record the token for that I/O operation. The host driver forms Ethernet command packet 80 and posts it on command work queue (e.g., 32). Ethernet command packet 80 is passed through packet classifier 34 on its way to data path processor 54, where it is processed and the I/O request is forwarded to shared storage controller 30.

Figure 5:
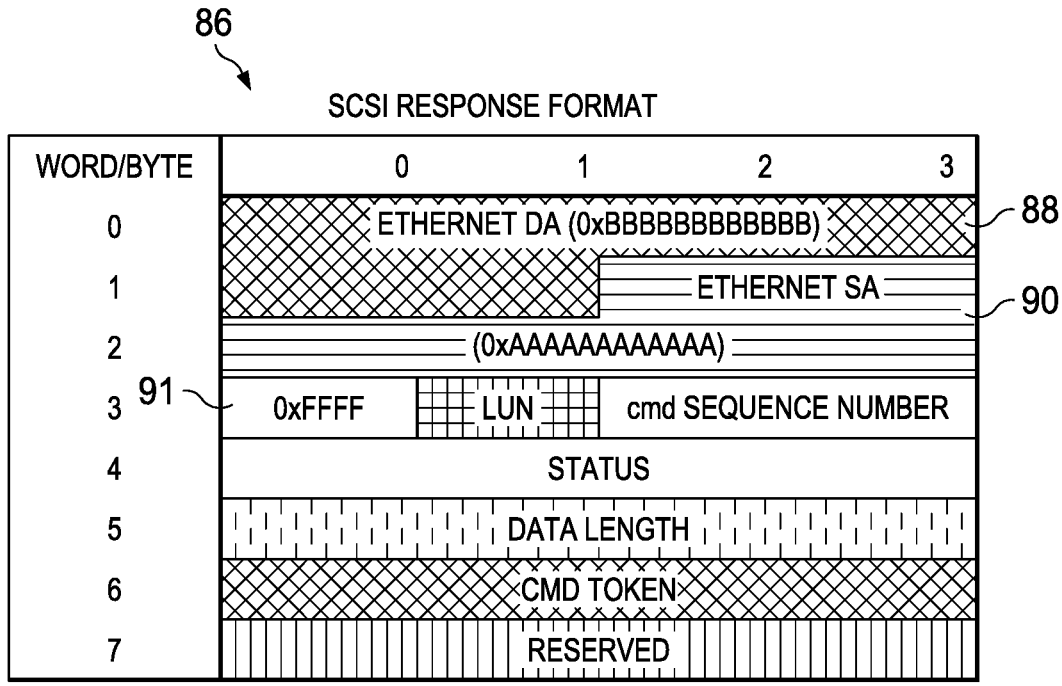
FIG. 5 is a simplified block diagram illustrating yet other example details of embodiments of the communication system.

Turning to FIG. 5, FIG. 5 is a simplified diagram illustrating example details of an Ethernet response packet 86 comprising a SCSI response according to an embodiment of communication system 10. Ethernet response packet 86 uses a fake preset destination MAC address 88, source MAC address 90, and Ethertype 91 to indicate its status as a SCSI response. In an example, destination and source MAC addresses 88 and 90 respectively comprise unique MAC addresses (e.g., 0xBBBBBBBBBBBB and 0xAAAA-AAAAAAAA, respectively); value of Etherytype 91 comprises 0xFFFF. Values of source MAC address 90, destination MAC address 88 and Ethertype 91 are programmed in packet classifier 34 to trap Ethernet response packet 86. For example, a value of 0xBBBBBBBBBBBB in destination MAC address 88 and a value of 0xAAAAAAAAAAAA in source MAC address 90 indicate that Ethernet response packet 86 encapsulates a SCSI response.

According to various embodiments, the I/O completions are formed by firmware executing on data path processor 54. Shared storage controller 30 notifies data path processor 54 after completion of a SCSI command. The firmware finds the associated SCSI command request and forms (e.g., generates, creates, etc.) Ethernet response packet 86 with fields as indicated in the figure. The firmware also places the token (CMD token) and sends the I/O completion notification comprising Ethernet response packet 86 on its response WQ 56. The I/O completion notification passes through packet classifier 34 and flow table 38 and is processed suitably as described herein.

Figure 6:
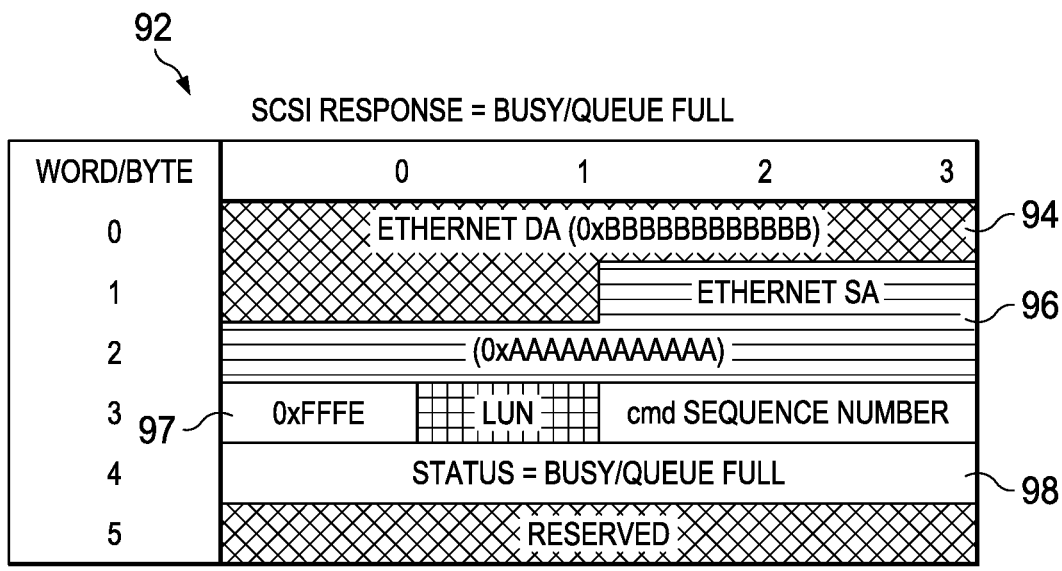
FIG. 6 is a simplified block diagram illustrating yet other example details of embodiments of the communication system.

Turning to FIG. 6, FIG. 6 is a simplified diagram illustrating example details of an Ethernet BUSY packet 92 according to an embodiment of communication system 10. During operation, when the firmware detects that there are no command descriptors to post the SCSI command, either because tokens are not available in common token pool 46, or per sNIC policy context 48 does not permit execution of the SCSI command, the firmware returns a BUSY/QUEUE FULL status back to the host driver using Ethernet BUSY packet 92. Ethernet BUSY packet 92 uses a fake destination MAC address 94, source MAC address 96, and Ethertype 97 to indicate its status as a SCSI response. In an example, destination and source MAC addresses 94 and 96 respectively comprise unique MAC addresses (e.g., 0xBBBB-BBBBBBBB and 0xAAAAAAAAAAAA, respectively); value of Ethertype 97 comprises 0xFFFE. Values of source MAC address 96 and destination MAC address 94 and Ethertype 97 are programmed in packet classifier 34 to trap Ethernet BUSY packet 92. A status field 98 in Ethernet BUSY packet 92 indicates the BUSY/QUEUE FULL status.

Turning to FIG. 7, FIG. 7 is a simplified diagram illustrating example details of packet classifier 34 according to an embodiment of communication system 10. Though SCSI command is processed by one of the data path processor, the firmware running on the control processor is responsible for sampling and aggregating the IOPS and throughput measurements periodically. Packet classifier 34 includes a filter field, a filter identifier (ID) field, and an action field. The SCSI commands issued by the host matches the SCSI command filter as configured in packet classifier 34. Example SCSI command filter 36 corresponds to certain destination MAC address value (e.g., 0xAAAAAA-AAAAAA), source MAC address value (e.g., 0xBBBBB-BBBBBBB) and Ethernet type (e.g., 0xFFFF). The filter ID value (e.g., 1) indicates that the filter is applied to a SCSI command packet. The action field indicates that flow table 38 is to be looked up. Example SCSI response filter 58 corresponds to certain destination MAC address value (e.g., 0xBBBBBBBBBBBB), source MAC address value (e.g., 0xAAAAAAAAAAAA) and Ethernet type (e.g., 0xFFFF). The filter ID value (e.g., 2 or 3) indicates that the filter is applied to a SCSI response packet or SCSI BUSY response packet; Ethertype (e.g., 0xFFFF or 0xFFFE) distinguishes a SCSI response packet from a SCSI BUSY response packet. The action field indicates that flow table 38 is to be looked up.

Turning to FIG. 8, FIG. 8 is a simplified diagram illustrating example details of a key 100 returned by packet classifier 34 after filtering the Ethernet packets comprising SCSI commands or SCSI responses (including SCSI busy responses) according to an embodiment of communication system 10. Key 100 to index into flow table 38 is formed by two parameters, filter ID and Logical Interface (LIF) ID. The filter ID identifies a classification type (e.g., command, response, busy) of the I/O operation. The LIF ID identifies the particular Host-1 or sNIC-1 associated with the I/O operation (e.g., which has issued the command or to which the response is destined). In an example embodiment, key 100 comprises a 13-bit key to a flow entry in flow table 38; the flow entry is 64 bytes wide, resulting in a flow table of size 512 KB.

Turning to FIG. 9, FIG. 9 is a simplified diagram illustrating example details of policy context 20 according to an embodiment of communication system 10. In various embodiments, the administrator can define storage QoS policies per compute node on a suitable GUI of UCS manager. Policy context 20 corresponding to each sNIC 24 and/or compute node 14 (e.g., sNIC-1, or Host-1) may comprise a state field 102, a priority field 104 and a policy type field 106. Note that although the example details are described in relation to particular sNIC-1 and/or Host-1, the description is equally applicable to any of sNICs 24 and/or compute nodes 14.

State field 102 indicates if I/O operations for associated sNIC-1 are "PAUSED" or "NOT PAUSED" (e.g., operational). sNIC-1 with a state of PAUSED is to be throttled. Priority field 104 indicates one of priorities "High," "Normal" and "Low" (note that any suitable number of priorities may be specified to indicate relative importance of associated sNIC-1 among a plurality of sNICs 24). The value of priority field 104 indicates the relative priority of associated sNIC-1 and it is used to determine whether particular sNIC-1 should be throttled in the event of over subscription. The administrator sets the value of priority field 104.

Policy type field 106 may indicate, merely as examples and not as limitations, maximum IOPS, maximum bandwidth utilization, minimum bandwidth guarantee, maximum IOPS+minimum bandwidth guarantee, and maximum bandwidth allowed+minimum bandwidth guaranteed. The policy types may be identified by label values, for example: policy type label=0x01 corresponds to maximum IOPS allowed for associated sNIC-1 (or Host-1); policy type label=0x02 corresponds to maximum bandwidth utilization allowed, specifying a maximum percentage utilization of shared storage resource 18 that can be used by associated sNIC-1 (or Host-1); policy type label=0x04 corresponds to minimum bandwidth utilization guaranteed, specifying a minimum percentage utilization of shared storage resource 18 to be reserved for associated sNIC-1 (or Host-1); policy type label=0x05 corresponds to maximum IOPs allowed and minimum bandwidth guaranteed for associated sNIC-1 (or Host-1); and policy type label=0x06 corresponds to maximum bandwidth allowed and minimum bandwidth guaranteed for associated sNIC-1 (or Host-1). Policy types 0x01 and 0x02 specify an upper ceiling for the storage utilization, whereas policy 0x06 defines a lower ceiling. For given sNIC-1 (or Host-1), the administrator can also specify a minimum value and a maximum value combination (e.g., <MIN, MAX>) to define both upper and lower limits. Policy type labels indicated herein (e.g., 0x01, 0x02, etc.) are arbitrary, and could include any suitable alphanumeric identifier within the broad scope of the embodiments.

Policy context 20 further includes a starve counter 108, denoting a count of I/O commands that had to be busied continuously due to lack of tokens. When a specific I/O command is awarded a token, starve counter field 108 is set to zero. Otherwise, every unsuccessful I/O command execution increments (e.g., by 1), the value of starve counter field 108. An outstanding tokens field 110 indicates a count of tokens consumed by associated sNIC-1 which are yet to be returned back to common token pool 46. The value of outstanding tokens field 110 indicates the number of outstanding I/O commands for sNIC-1.

A maximum threshold tokens field 112 indicates the maximum number of tokens that can be outstanding at any given time for any policy type that includes a maximum bandwidth limitation. Any I/O command resulting in the current outstanding token count to increase beyond the value of maximum outstanding tokens field 112 is throttled. A minimum threshold tokens field 114 indicates the minimum number of tokens required to sustain the guaranteed bandwidth utilization for any policy type that includes a minimum bandwidth guarantee. If current outstanding token count decreases below the value of minimum threshold tokens field 114, starve counter 108 is incremented until I/O operations of other sNICs 24 are throttled. A maximum IOPS field 116 specifies the allowed maximum IOPS for any policy type that specifies the maximum IOPS.

Turning to FIG. 10, FIG. 10 is a simplified diagram illustrating example details of flow table 38 according to an embodiment of communication system 10. According to an example embodiment, each of sNICs 24, for example, sNIC-1, is associated with three flow table entries, namely command entry 40, response entry 60 and BUSY response entry 61. As an example, consider command entry 40. Command entry 40 includes fields for a key, packet count, total I/O bytes, IOPs, sNIC policy context, rewrite rules and steering action. The key indicates the LIF ID (e.g., which identifies the sNIC associated with the flow table entry, say sNIC-1) and filter ID. For a SCSI command, the filter ID corresponds to 1 (or other suitable unique identifier).

During operation, packet classifier 34 filters Ethernet command packet 80 and returns key 100, including LIF ID for sNIC-1 and filter ID 1. Key 100 is used to index into flow table 38; the lookup yields command entry 40 for sNIC-1. The total command count for sNIC-1 is entered into the packet count field. The value indicates the total number of I/O operations initiated by sNIC-1. In various embodiments, each flow table entry records the number of hits in flow table 38. For example, the packet count field value for all entries in the aggregate indicates the total number of hits in flow table 38 during a specified predetermined time interval. Because the space allocated for tuples is larger than the size of the key (2 bytes) used to index, the remaining space in flow table 38 can be used to store per sNIC policy context information and to track I/O related information, such as the total bytes transferred in a successful I/O operation. In various embodiments, the total I/O bytes field is updated by appropriate microcode routines invoked as part of the I/O completion handling.

Total I/O bytes field remains empty for filter ID associated with the SCSI command. IOPS field indicates the IOPS completion per second for sNIC-1; the value of the field is completed after the associated SCSI command is successfully completed. In an example embodiment, the I/O completions per second are monitored by a thread executing on control processor 50. It measures the IOPS by taking into account the number of successful completions per second from flow table entry 60 corresponding to the same LIF ID (sNIC-1) and filter ID=2. sNIC policy context field indicates the policy type for sNIC-1 (e.g., storage access parameters and the context required to maintain active state). The rewrite rules field identifies the specific arbiter routine to be used for sNIC-1 for the specific filter ID 1. The value of the rewrite rules field provides an address or ID of the rewrite rule to be invoked as a result of the flow table hit. A steering action field provides an RQ number associated with a particular data processor (e.g., 54) where the associated SCSI command is processed.

Similarly, in the response data path, Ethernet response packet 86 for sNIC-1 returns key 100, including LIF ID for sNIC-1 and filter ID 2 at packet classifier 34. Key 100 is used to index into flow table 38; the lookup yields command entry 60 for sNIC-1. The total response count for sNIC-1 is entered into the packet count field. The value indicates the total number of I/O operations successfully completed by sNIC-1. The total bytes transferred in the successful I/O operation is entered in the total I/O bytes field. In some embodiments, the value of the field indicates the cumulative bytes transferred for associated sNIC-1. The sNIC policy context field is populated by an address pointing to the QoS policy context area for associated sNIC-1. The policy context is maintained in flow table entry 40 associated with sNIC-1 and filter ID=1. Rewrite rule field is populated (by firmware executing on control processor 50) with the address or ID of the rewrite rule to be invoked as a result of the flow table hit. The steering action field is populated (by firmware executing on control processor 50) with the host RQ to which the packet is forwarded.

Likewise, in the BUSY response path, Ethernet BUSY packet 92 for sNIC-1 returns key 100, including LIF ID for sNIC-1 and filter ID 3 at packet classifier 34. Key 100 is used to index into flow table 38; the lookup yields command entry 61 for sNIC-1. The total number of commands responded with BUSY status is entered in the packet count field. The total I/O bytes field and the IOPS field remain empty. The rewrite rule field provides a decap rewrite rule to be invoked to strip off the Ethernet header of Ethernet BUSY packet 92. The value of the steering action field indicates the host RQ of sNIC-1 to which the packet is forwarded.

Figure 11:
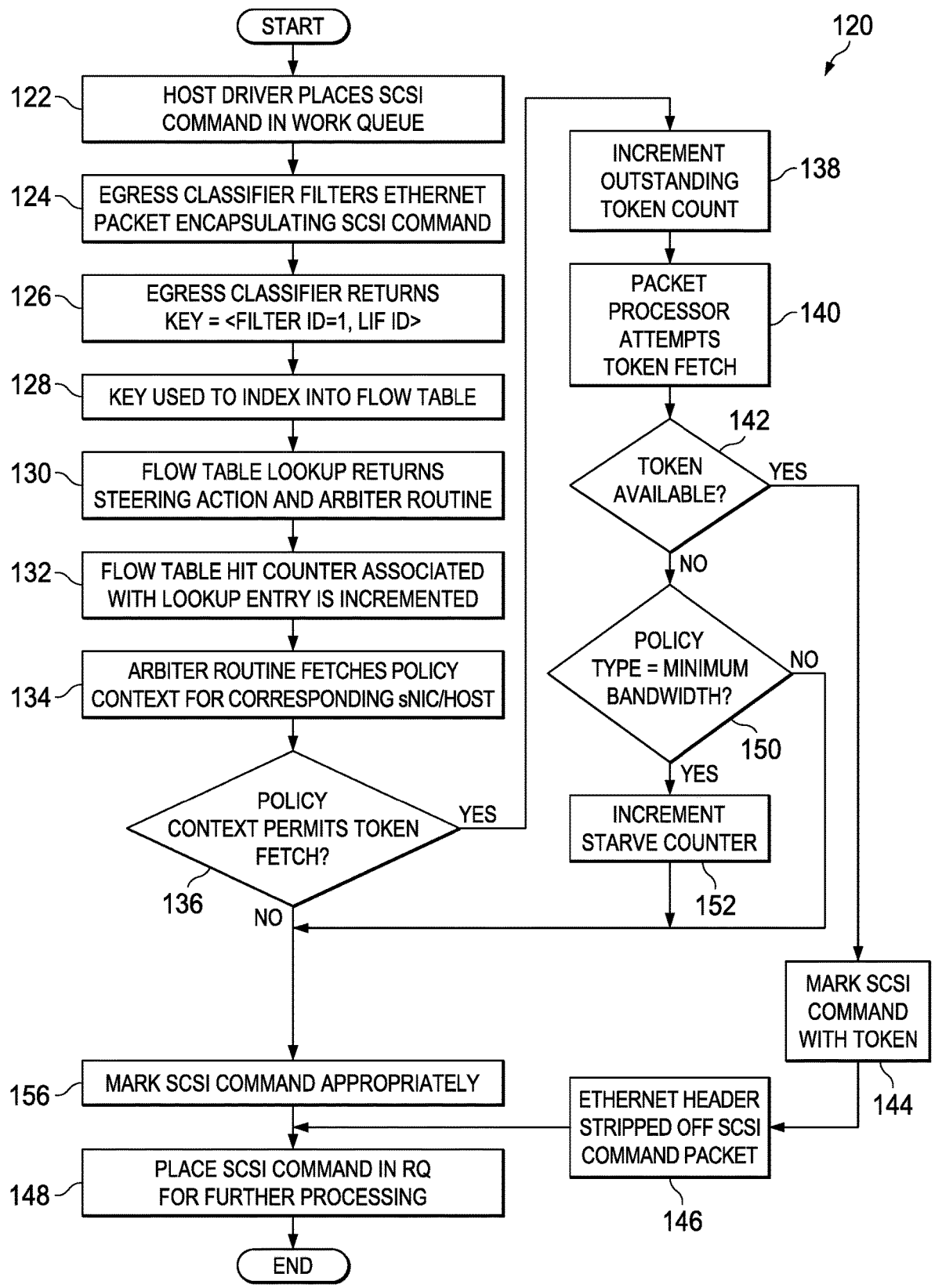
FIG. 11 is a simplified flow diagram illustrating example operations that may be associated with an embodiment of the communication system.

Turning to FIG. 11, FIG. 11 is a simplified flow diagram illustrating example operations 120 that may be associated with an embodiment of communication system 10. At 122, the host driver places a SCSI command in command work queue 32 of sNIC-1 as Ethernet command packet 80. At 124, packet classifier 34 filters Ethernet command packet 80 encapsulating the SCSI command. Ethernet command packet 80 finds a match in packet classifier 34, which returns a tuple <Filter ID=1, LIF Id> as key 100 at 126. Filter ID=1 classifies the packet as a SCSI command packet. Note that although filters IDs of 1, 2 and 3 are disclosed herein, any suitable filter ID value may be used within the broad scope of the embodiments to represent SCSI command, SCSI response and SCSI BUSY response.

At 128, key 100 is used to index into flow table 38, according to the action step mandated in packet classifier 34. At 130, the flow table match returns a steering action and arbiter routine (e.g., rewrite rule) to be invoked on Ethernet command packet 80 comprising the SCSI command. The flow table hit counter (e.g., packet count field) associated with the lookup entry is also incremented at 132. At 134, appropriate arbiter routine fetches per sNIC policy context 48 for corresponding sNIC-1 (or Host-1). In an example embodiment, the policy context is stored in a flow table memory region to ensure its presence in an L2 cache.

At 136, arbiter routine determines whether the policy context permits a token fetch. For example, policy context 20 for sNIC-1 is read. If the value of state field 102 is PAUSED, indicating that the I/O operation is throttled, no token is awarded. If policy type field 106 has a value of 0x01 or 0x05 (or otherwise indicates maximum IOPS count), the arbiter routine checks the current IOPS count, and if it is higher than the value in maximum IOPs field 116, no token is awarded. If the policy type field 106 has a value of 0x02 or 0x06 (or otherwise indicates maximum bandwidth), the arbiter routine checks the current outstanding token count, and if it is greater than the value of maximum threshold tokens field 112, the I/O operations is throttled and no token is awarded. If a token fetch is permitted, at 138, the outstanding token count is incremented. At 140, packet processor 42 attempts a token fetch from common token pool 46. At 142, a determination may be made whether a token is available in common token pool 46. If a token is available, at 144, the SCSI command is marked with the token. At 146, the Ethernet header is stripped from Ethernet command packet 80. At 148, the SCSI command is placed in command RQ 52 for further processing by data processor 54.

Turning back to 142, if no token is available in common token pool 46, at 150, a determination is made whether policy context 20 specifies a minimum bandwidth policy type. For example, policy types 0x04 and 0x06 specify a minimum guaranteed bandwidth. If so, at 152, the value of starve counter field 108 is incremented and the command packet is marked to indicate the unavailability of the token at 156. On the other hand, if the token is awarded, the value of starve counter field 108 is reset to zero. At 150, if the policy type does not specify any minimum bandwidth, the operations step to 156, at which the command packet is marked to indicate the unavailability of the token. The operations step to 148, with the SCSI command being placed in command RQ 52 for further processing by data processor 54. Turning back to 136, if policy context 20 does not permit a token fetch, the operations step to 156, at which the command packet is marked to indicate the unavailability of the token, and continue thereafter. In any case, the command arrives at data path processor 54 either with an assigned token or indication that the command cannot be processed and is to be busied. Data processor 54 uses a command index specified in the token to issue an I/O command to shared storage controller 30, or takes other steps as appropriate.

Figure 12:
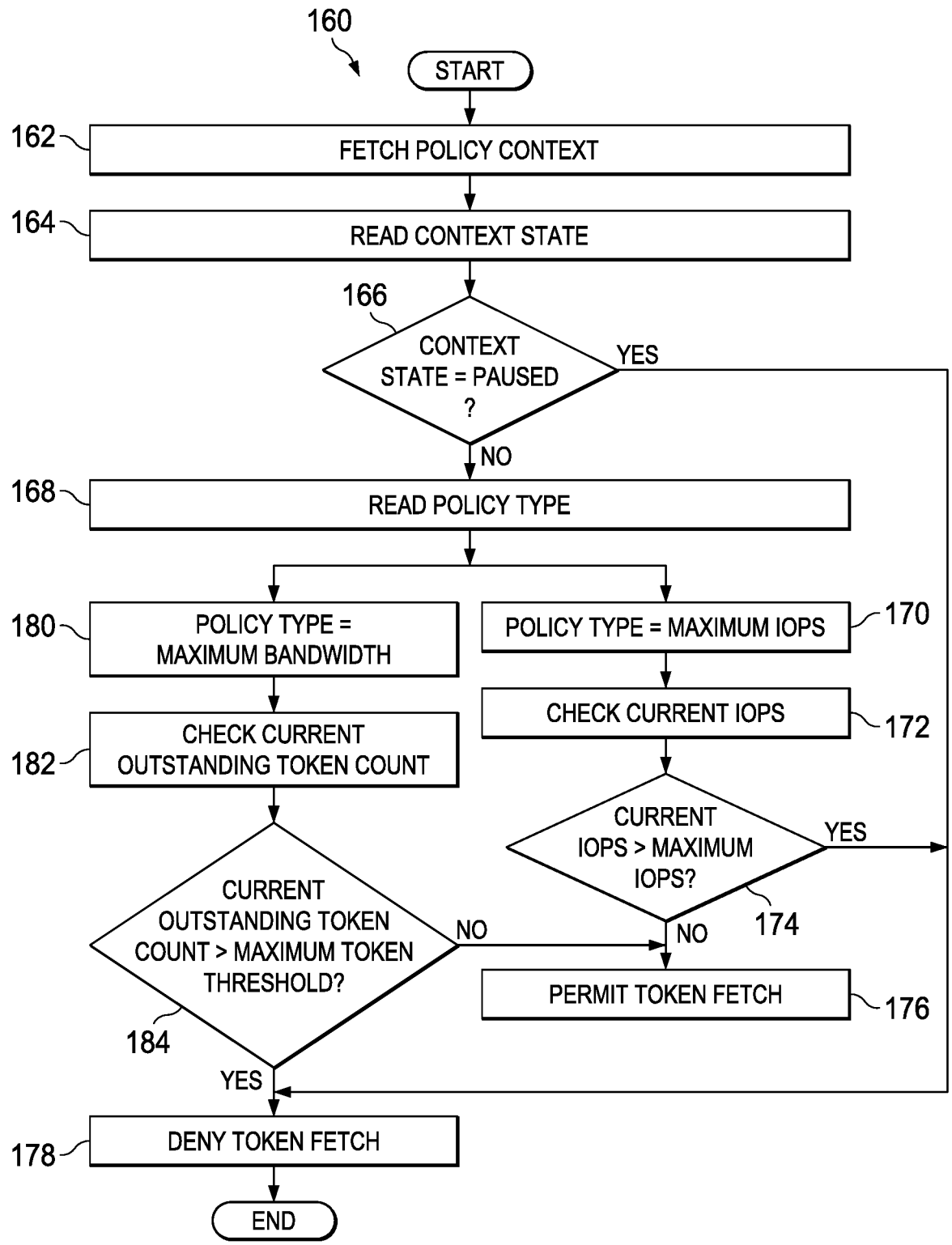
FIG. 12 is a simplified flow diagram illustrating other example operations that may be associated with an embodiment of the communication system.

Turning to FIG. 12, FIG. 12 is a simplified flow diagram illustrating example operations 160 that may be associated with embodiments of communication system 10. At 162, policy context 20 associated with sNIC-1 may be fetched by the arbiter routine. At 164, value of state field 102 of policy context 20 for sNIC-1 is read. At 166, a determination is made if the value of state field 102 is PAUSED. If not, at 168, value of policy type field 106 is read. According to various embodiments, the policy type may indicate maximum bandwidth (e.g., policy type=0x02 or 0x06), or maximum IOPS (e.g., policy type=0x01 or 0x5). If the policy type indicates maximum IOPS at 170, at 172, current IOPS is checked. At 174, a determination is made whether the current IOPS is higher than the value in maximum IOPs field 116. If it is not higher, at 176, token fetch is permitted. On the other hand, if it is higher, at 178, token fetch is denied.

Turning to 168, if the policy type indicates maximum bandwidth at 180, at 182, the current outstanding token count is checked by the arbiter routine in packet processor 42. if it is greater than the value of maximum threshold tokens field 112, the I/O operations is throttled and no token is awarded at 178. If it is not greater than the value of maximum threshold tokens field 112, the token fetch may be permitted at 176. Turning back to 166, if the context state is PAUSED, indicating the I/O operation is throttled, the operations step to 178, at which the token fetch is denied.

Figure 13:
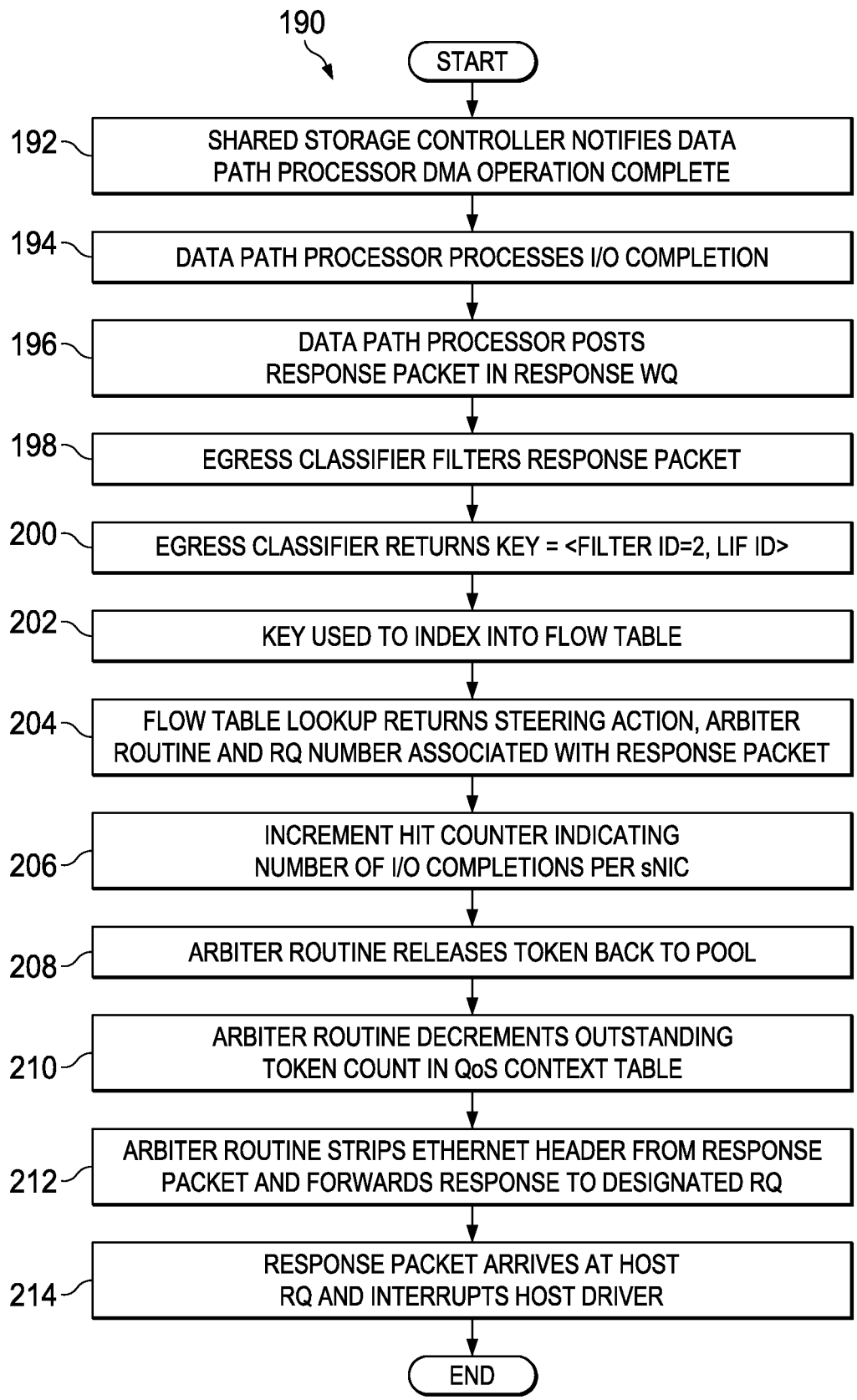
FIG. 13 is a simplified flow diagram illustrating yet other example operations that may be associated with an embodiment of the communication system.

Turning to FIG. 13, FIG. 13 is a simplified flow diagram illustrating operations 190 that may be associated with embodiments of communication system 10. At 192, shared storage controller 30 notifies data path processor 54 that DMA operation is complete. At 194, data path processor 54 processes the I/O completion notification, associating the notification with the outstanding I/O command. At 196, data path processor generates Ethernet response packet 86 and posts Ethernet response packet 86 in its Response WQ 58. At 198, packet classifier 34 filters Ethernet response packet 86, for example, by matching relevant fields with the filter values. At 200, packet classifier 34 returns the result of the match as a tuple, <Filter ID=2, LIF ID>. At 202, key 100 is used to index into flow table 38. At 204, the flow table lookup returns a steering action, RQ number associated with the SCSI command at sNIC-1, and an appropriate arbiter routine address.

At 206, the hit counter indicating number of I/O operations completed per second is incremented. At 208, the arbiter routine releases the token back to common token pool 46. At 210, the arbiter routine decrements the outstanding token count in a QoS context table. At 212, the arbiter routine strips the Ethernet header from Ethernet response packet 86, and forwards the response to the designated RQ. At 214, the response packet arrives at the host RQ and interrupts the host driver that initiated the SCSI I/O operation.

Figure 14:
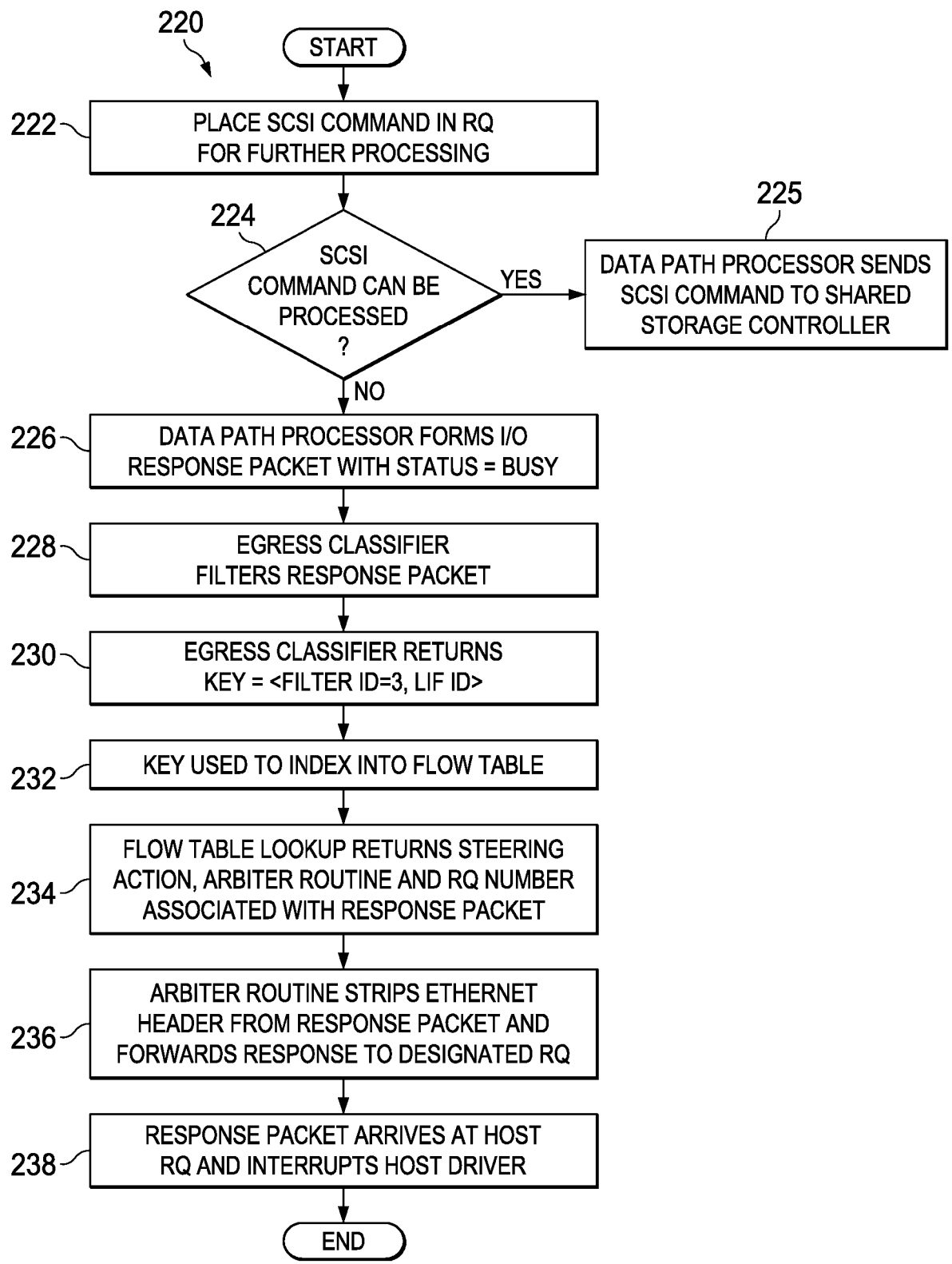
FIG. 14 is a simplified flow diagram illustrating yet other example operations that may be associated with an embodiment of the communication system.

Turning to FIG. 14, FIG. 14 is a simplified flow diagram illustrating example operations 220 that may be associated with embodiments of communication system 10. At 222, the SCSI command is placed in command RQ 52 of data processor 54. At 224, a determination is made whether the SCSI command can be processed. The determination is based on the token indicator associated with the SCSI command, or throttling of the I/O operation based on policy context 20. If tokens are available as indicated in the SCSI command, at 225, data path processor 54 sends the SCSI command to shared storage controller 30 for further processing. If no tokens are available, at 226, data path processor 54 forms (e.g., generates, creates, formats, etc.) Ethernet BUSY packet 90 with status=BUSY. At 228, packet classifier 34 filters Ethernet BUSY packet 90. At 230, packet classifier 54 returns key 100 with tuple <Filter ID=3, LIF ID>. At 232, key 100 is used to index into flow table 38. At 234, the flow table lookup returns an appropriate steering action, arbiter routine and RQ number associated with the response packet of the I/O operation. At 236, the arbiter routine strips the Ethernet header from Ethernet BUSY packet 90, and forwards the response to the designated RQ. At 238, the BUSY packet arrives at the host RQ and interrupts the host driver that initiated the SCSI I/O operation.

Figure 15:
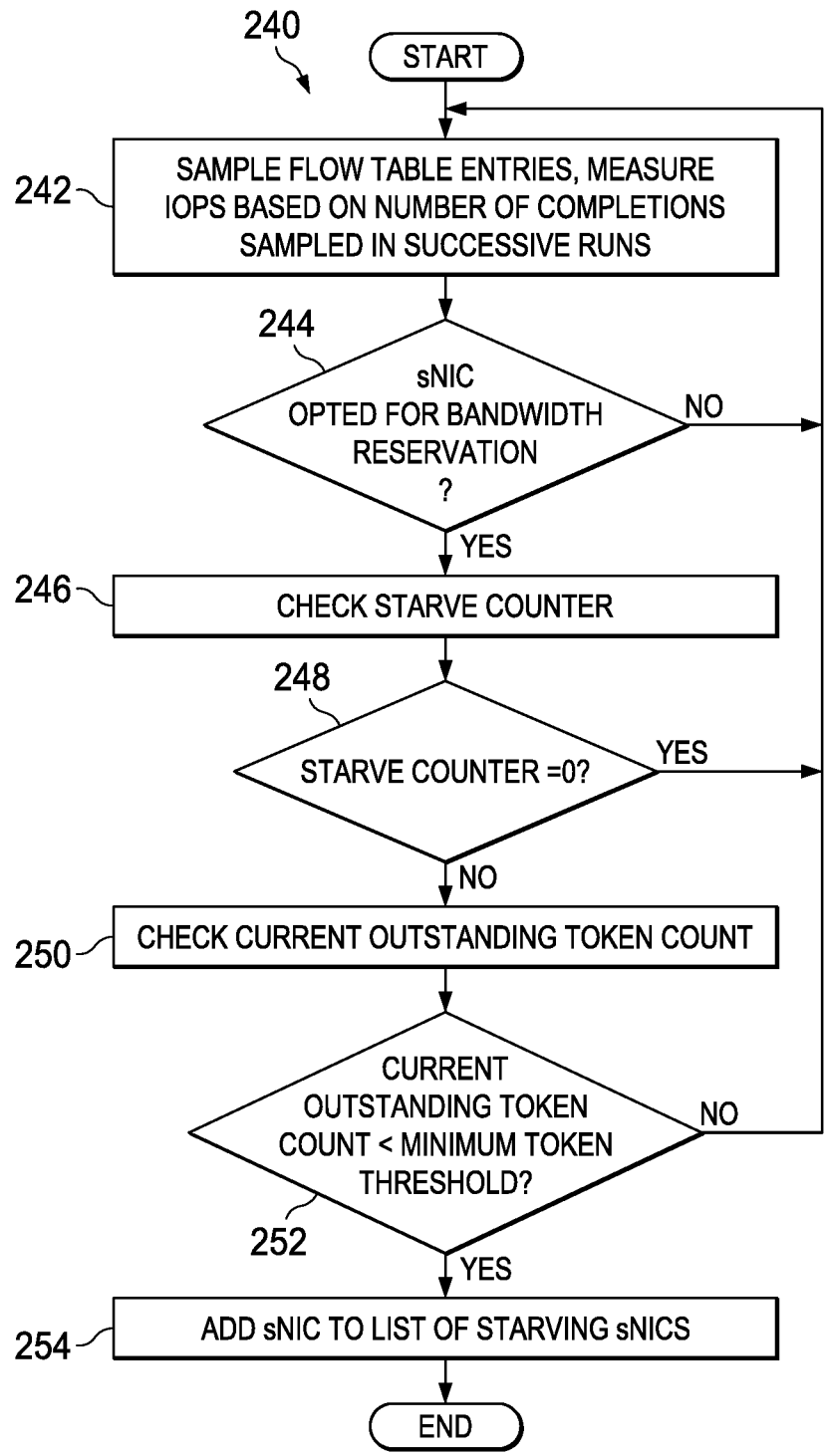
FIG. 15 is a simplified flow diagram illustrating yet other example operations that may be associated with an embodiment of the communication system.

Turning to FIG. 15, FIG. 15 is a simplified flow diagram illustrating example operations 240 performed by periodic sampler 66 that may be associated with an embodiment of communication system 10. At 242, low frequency periodic sampler 66 samples the flow table entries for sNICs 24 and measures IOPS based on the number of completions sampled in successive runs. At 244, period sampler 66 determines whether the particular sNIC associated with the flow table entry being sampled has opted for bandwidth reservation (e.g., policy context 20 indicates minimum guaranteed bandwidth). If so, at 246, periodic sampler 66 checks the value of starve counter field 108. A determination is made at 248 if the value of starve counter field 108 is zero. If the value of starve counter field 108 is 0, the operations revert to 242, and other flow table entries are sampled. If the value of starve counter field 108 is non-zero, at 250, periodic sampler 66 checks the outstanding token count. At 252, a determination is made whether the outstanding token count is less than the value of minimum threshold tokens field 114. If not, the operations revert to 242, and the next flow table entry is sampled. If the outstanding token count is less than the value of minimum threshold tokens field 114, starvation is indicated, where the I/O operations cannot be completed at the minimum guaranteed bandwidth. The sNIC associated with the flow table entry being sampled is considered as a starving sNIC and added to starving sNIC list 72 at 254.

In various embodiments, operations 240 may be performed in a single sweep (e.g., execution, run, etc.) of periodic sampler 66. In other embodiments, operations 240 may be performed piecemeal, for example, within a predetermined time interval, or until starving sNIC list 72 reaches a particular size. Various other options that determine a frequency of execution of periodic sampler 66 may be used within the broad scope of the embodiments.

In some embodiments, low frequency periodic sampler 66 detects during its execution that some of sNICs 24 are being throttled and monitors the condition of sNICs 24 that have minimum bandwidth requirement. If all sNICs 24 are able to perform I/O operations at guaranteed bandwidth, periodic sampler 66 unblocks sNICs 24 from throttled sNIC list 74 in the reverse order in which sNICs 24 were initially added to throttled sNIC list 74. In some embodiments, in every invocation of low frequency periodic sampler 66, a predetermined subset of throttled sNICs 24 are unblocked, for example, to avoid overload on the system. While unblocking, periodic sampler 66 monitors the situation and stops the unblock operation if at least one starved sNIC 24 is detected.

Figure 16:
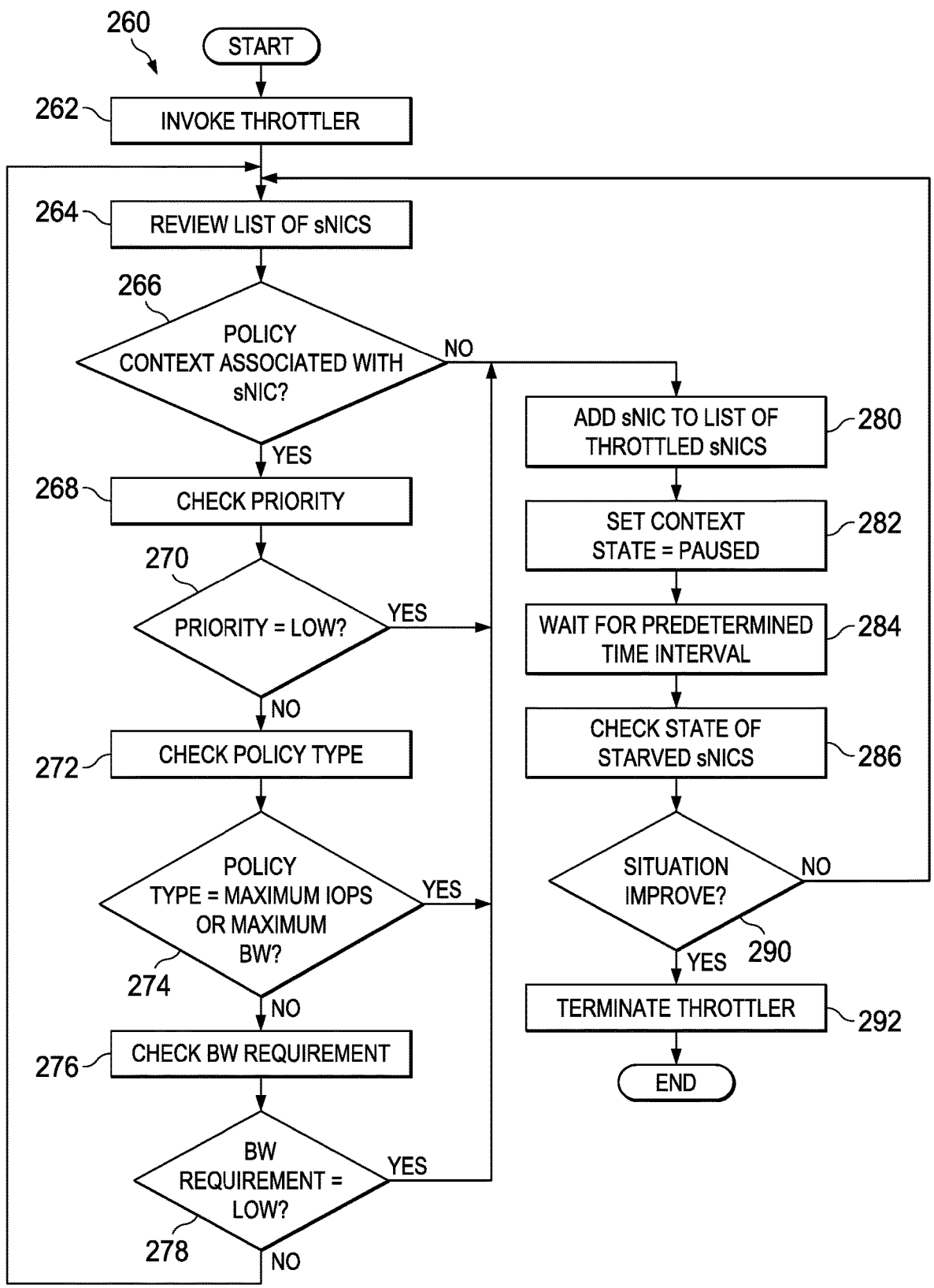
FIG. 16 is a simplified flow diagram illustrating yet other example operations that may be associated with an embodiment of the communication system.

Turning to FIG. 16, FIG. 16 is a simplified flow diagram illustrating example operations 260 of throttler 68 that may be associated with embodiments of communication system 10. High frequency throttler 68 is invoked at 262. In some embodiments, throttler 68 is evoked on demand. In other embodiments, throttler 68 is evoked at predetermined time intervals. In some embodiments, throttler 68 is scheduled to execute at least once in a predetermined time interval (e.g., every 100 ms) after being invoked until violations of policy context 20 are resolved satisfactorily. At 264, throttler 68 reviews sNIC list 70.

For each sNIC on sNIC list 70, throttler 68 performs the following operations. At 266, throttler 68 makes a determination whether the sNIC has any specific policy context 20 associated therewith. If the sNIC has a specific policy context 20 associated therewith, at 268, throttler 68 checks the value of priority field 104 in policy context 20. At 270, throttler 68 makes a determination whether the value of priority field 104 is "low". If the value of priority field 104 is not "low" (e.g., low priority sNICs are selected before "normal" priority sNICs), at 272, throttler 68 checks the value of policy type field 106 in policy context 20. At 274, throttler 68 makes a determination whether the value of policy type field 106 indicates a Max IOPS (e.g., 0x01) or Max Bandwidth utilization (e.g., 0x02) policy. If not, at 276, throttler 68 checks any bandwidth requirement in policy context 20. At 278, throttler 68 makes a determination whether the bandwidth requirement is low (e.g., relatively lower than other sNICs) and the sNIC is not experiencing any violation of its per sNIC policy context 48. If not, the operations revert to 264, and the next sNIC in sNIC list 70 is reviewed. If bandwidth requirement is low, at 280, the sNIC is added to throttled sNIC list 74.

Turning back to 266, if no policy context 20 is associated with the sNIC, the sNIC is added to throttled sNIC list 74. Turning back to 270, if the value of priority field 104 is "low", the sNIC is added to throttled sNIC list 74. Turning back to 274, if the value of policy type field 106 indicates a Max IOPS (e.g., 0x01) or Max Bandwidth utilization (e.g., 0x02) policy, the sNIC is added to throttled sNIC list 74.

At 282, the context state of sNICs in throttled sNIC list 74 is set to PAUSED. Setting the context state to PAUSED throttles any I/O operation associated with the sNIC. At 284, throttler 68 waits for a predetermined time interval (e.g., 100 ms). At 286, throttler 68 checks the state of starving sNIC list 72. At 290, throttler 68 makes a determination whether a size of starving sNIC list 72 has decreased (e.g., indicating fewer number of starving sNICs) and the situation has improved. If starving sNIC list 72 has not decreased in size, the operations revert to 264, and additional sNICs are selected to be throttled. If the situation has improved (e.g., previously starved sNICs are able to perform I/O operations at desired bandwidth utilization) throttler 68 is terminated at 292. In some embodiments, before terminating, throttler 68 also updates QoS monitor 64 to indicate completion of the throttling task.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software. In some embodiments, one or more of these features may be implemented in hardware, provided external to these elements, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, the VNFs and associated servers described and shown herein (and/or their associated structures) may also include suitable interfaces for receiving, transmitting, and/or otherwise communicating data or information in a network environment. The VNFs described herein may be provisioned on servers comprising memory elements and processors. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., storage resource 18, packet classifier 34, flow table 38) can store data used for the operations described herein. This includes the memory element being able to store instructions (e.g., software, logic, code, etc.) in non-transitory media, such that the instructions are executed to carry out the activities described in this Specification. A processor (e.g., control processor 50, packet processor 42, data path processor 54) can execute any type of instructions associated with the data to achieve the operations detailed herein in this Specification. In one example, processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in the communication system could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

In various embodiments, the operations described herein facilitate improvements in storage traffic optimization technologies, allowing compute nodes 14 to operate faster, or more efficiently according to administrator specified policies at a central management application in the network. The operations described herein solve problems uniquely associated with a multi-host computing environment, in which multiple compute nodes 14 access shared storage resource 18 through a shared transmission medium (e.g., PCIe bus). Such problems did not exist before computers or computer networks, or before multiple computing devices were aggregated together for shared efficiencies.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, the communication system may be applicable to other exchanges or routing protocols. Moreover, although the communication system has been illustrated with reference to particular elements and operations that facilitate the communication process, these elements, and operations may be replaced by any suitable architecture or process that achieves the intended functionality of the communication system.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for managing policy contexts prescribing storage access parameters of respective compute nodes within a microserver chassis comprising a plurality of compute nodes, a shared storage resource, and an input/output (I/O) adapter, the method comprising:
   allocating tokens to command descriptors associated with I/O operations for accessing the shared storage resource;
   identifying a violation of any policy context of any of the compute nodes based on availability of the tokens, comprising:
      sampling flow table entries in the I/O adapter to measure a number of input/output operations per second (IOPS) for the shared storage resource from the I/O adapter;
      determining from the sampling based on the number of TOPS for the shared storage resource whether any Small Computer System Interface network interface card (sNICs) associated with respective compute nodes are marked as starved; and
   identifying as a violation any sNIC marked as starved for unavailability of the token.

2. The method of claim 1, further comprising programming a packet classifier in the I/O adapter to filter storage traffic local to the microserver chassis.

3. The method of claim 1, further comprising populating a flow table in the I/O adapter with actions according to the any policy context.

4. The method of claim 1, further comprising throttling one or more of the I/O operations by executing a frequency throttler comprising a thread of instructions.

5. The method of claim 4, wherein the throttling identifies sNICs associated with respective compute nodes that are throttleable based on respective policy contexts associated with their corresponding compute nodes.

6. The method of claim 5, wherein the throttling adds the identified sNICs to a list of throttled sNICs.

7. The method of claim 6, wherein the throttling changes a context state in corresponding policy contexts associated with the identified sNICs to indicate that I/O operations are paused, wherein no tokens are awarded to paused sNICs.

8. A non-transitory tangible computer readable media that includes instructions for execution, which when executed by a processor, performs operations comprising:
   allocating tokens to command descriptors associated with I/O operations for accessing a shared storage resource;
   identifying a violation of any policy context of any compute nodes in a microserver chassis based on availability of the tokens, comprising:
      sampling flow table entries in the I/O adapter to measure a number of input/output operations per second (IOPS) for the shared storage resource from the I/O adapter;
      determining from the sampling based on the number of TOPS for the shared storage resource whether any Small Computer System Interface network interface card (sNICs) associated with respective compute nodes are marked as starved; and
   identifying as a violation any sNIC marked as starved for unavailability of the token.

9. The media of claim 8, the operations further comprising programming a packet classifier in an I/O adapter of the microserver chassis to filter storage traffic local to the microserver chassis.

10. The media of claim 8, the operations further comprising populating a flow table in an I/O adapter of the microserver chassis with actions according to the any policy context.

11. The media of claim 8, the operations further comprising throttling one or more of the I/O operations by executing a frequency throttler comprising a thread of instructions.

12. The media of claim 11, wherein the throttling identifies sNICs associated with respective compute nodes that are throttleable based on respective policy contexts associated with their corresponding compute nodes.

13. The media of claim 12, wherein the throttling adds the identified sNICs to a list of throttled sNICs.

14. The media of claim 13, wherein the throttling changes a context state in corresponding policy contexts associated with the identified sNICs to indicate that I/O operations are paused, wherein no tokens are awarded to paused sNICs.

15. An apparatus including a microserver chassis including a plurality of compute nodes; a shared storage resource; an I/O adapter facilitating access by the compute nodes to the shared storage resource over a shared transmission medium; and at least one processor, wherein the processor executes instructions, the apparatus being programmed to perform operations comprising:
   allocating tokens to command descriptors associated with I/O operations for accessing the shared storage resource;
   identifying a violation of any policy context of any of the compute nodes based on availability of the tokens, comprising:
      sampling flow table entries in the I/O adapter to measure a number of input/output operations per second (IOPS) for the shared storage resource from the I/O adapter;
      determining from the sampling determining from the sampling based on the number of TOPS for the shared storage resource whether any Small Computer System Interface network interface card (sNICs) associated with respective compute nodes are marked as starved; and
   identifying as a violation any sNIC marked as starved for unavailability of the token.

16. The apparatus of claim 15, the operations further comprising programming a packet classifier in the I/O adapter to filter storage traffic local to the microserver chassis.

17. The apparatus of claim 15, the operations further comprising populating a flow table in the I/O adapter with actions according to the any policy context.

18. The apparatus of claim 15, the operations further comprising throttling one or more of the I/O operations by executing a frequency throttler comprising a thread of instructions.

19. The apparatus of claim 18, wherein the throttling identifies sNICs associated with respective compute nodes that are throttleable based on respective policy contexts associated with their corresponding compute nodes.

20. The apparatus of claim 19, wherein the throttling adds the identified sNICs to a list of throttled sNICs.

* * * * *